United States Patent

[11] 3,584,641

| [72] | Inventors | Bertram J. Milleville;<br>Eldert B. Pool; Mathew L. Freeman, all of Pittsburgh, Pa. |
|---|---|---|
| [21] | Appl. No. | 695,487 |
| [22] | Filed | Jan. 3, 1968 |
| [45] | Patented | June 15, 1971 |
| [73] | Assignee | Rockwell Manufacturing Company<br>Pittsburgh, Pa. |

[54] LUBRICATED VALVE ASSEMBLY
28 Claims, 18 Drawing Figs.

[52] U.S. Cl. .................................................. 137/246.15,
251/172, 251/174, 251/315, 137/246.22
[51] Int. Cl. .................................................. F16k 5/22
[50] Field of Search .......................................... 251/315,
172, 174; 137/246.15, 246.16, 246.22

[56] References Cited
UNITED STATES PATENTS

| 2,516,947 | 8/1950 | Blevans | 251/315 |
| 2,930,576 | 3/1960 | Sanctuary | 251/315X |
| 2,989,990 | 6/1961 | Bass | 251/315X |
| 3,100,499 | 8/1963 | Bass | 251/315X |
| 3,173,648 | 3/1965 | McGuire | 251/315X |
| 3,228,652 | 1/1966 | Antrim | 251/174X |
| 3,235,224 | 2/1966 | Grove | 251/315X |
| 3,272,472 | 9/1966 | Goldman | 251/315X |
| 3,306,315 | 2/1967 | Cook | 251/315X |
| 3,345,032 | 10/1967 | Rawstron | 251/172 |
| 3,356,333 | 12/1967 | Scaramucci | 251/315X |
| 3,357,679 | 12/1967 | Gulick | 251/172 |
| 3,372,901 | 3/1968 | Manor | 251/315 |
| 3,380,708 | 4/1968 | Scaramucci | 251/315 |
| 3,424,190 | 1/1969 | Wolfensperger | 251/315 |

*Primary Examiner*—Clarence R. Gordon
*Attorney*—Strauch, Nolan, Neale, Nies & Kurz ABSTRACT: A valve seat ring construction having a solid annulus of nonmetallic, elastically deformable material anchored in an annular groove of a rigid seat ring and projecting therefrom for bearing engagement with the surface of a valve closure member such as a ball-type valve plug. Two annular sealing lips of different diameters are integral with the annulus and are resiliently compressed against the plug surface by a second annulus of elastically deformable material which is anchored on the opposite end of the seat ring and which is adapted to be compressed against the interior of the valve body for thrusting the seat ring toward the valve plug. A lip on the second annulus provides a seat-to-valve body seal. One of the sealing lips on the first-mentioned annulus normally provides the primary seat-to-valve plug seal by being compressed more and having a greater contact sealing area than the other lip. The seat-to-valve plug sealing lips are so oriented and cooperate in such a manner with the other parts of the seat ring construction that if the lip providing the primary seal should fail, allowing leakage, the primary seal will be transferred to the other lip by automatically increasing the compression of the other lip against the plug surface.

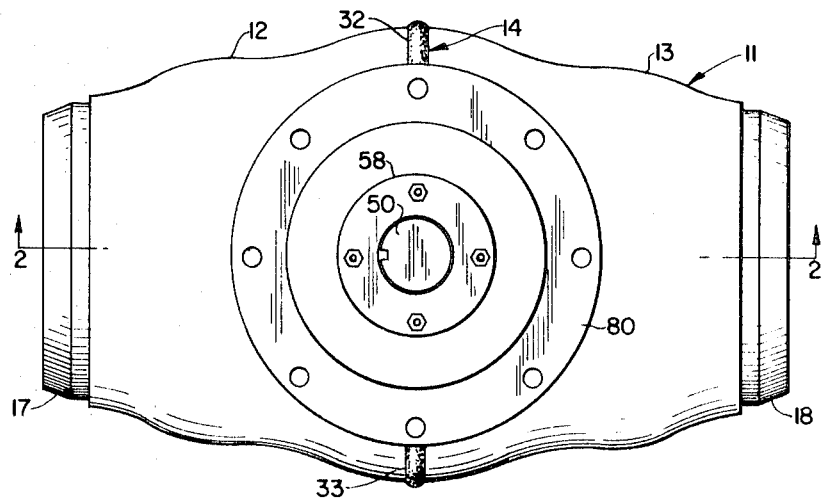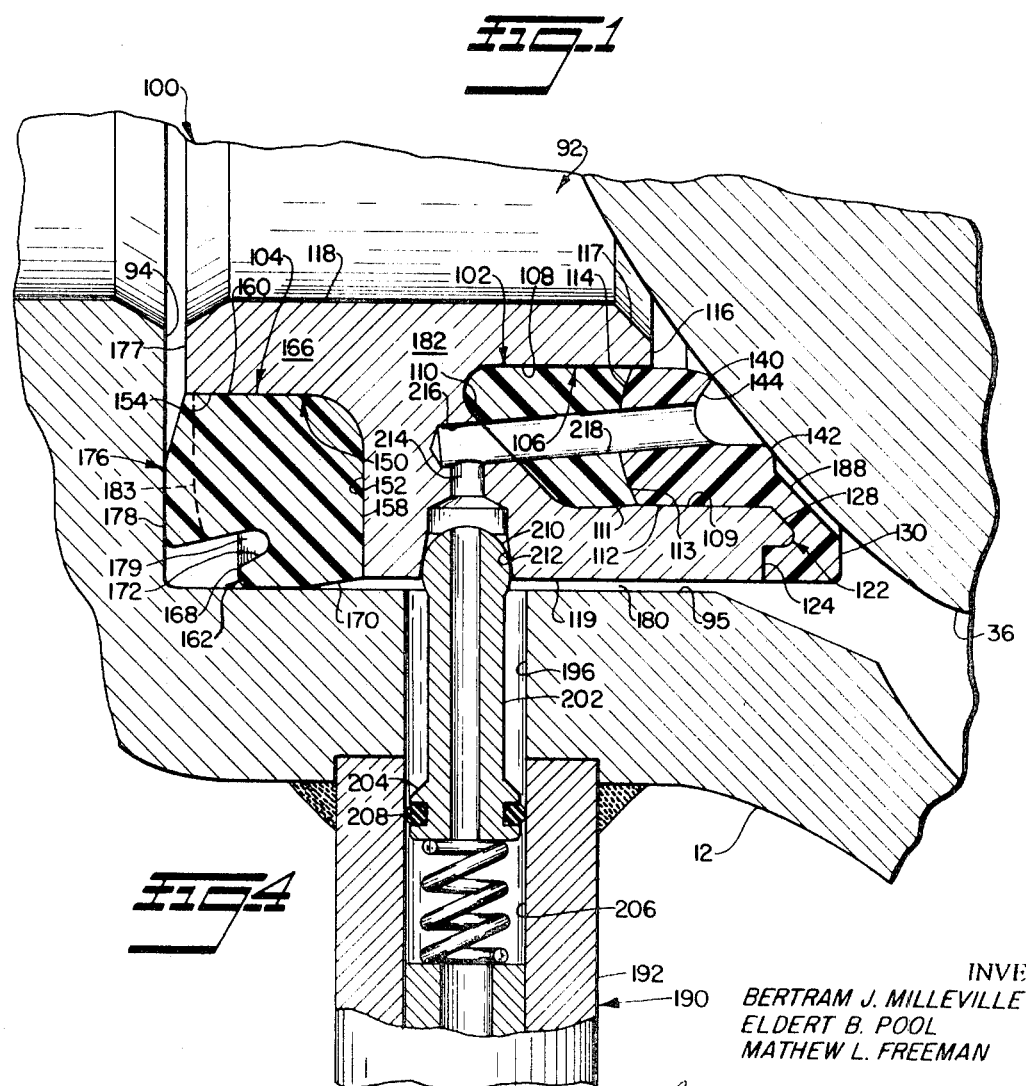
INVENTORS
BERTRAM J. MILLEVILLE
ELDERT B. POOL
MATHEW L. FREEMAN
BY Strauch, Nolan, Neale, Nies & Kurz
ATTORNEYS

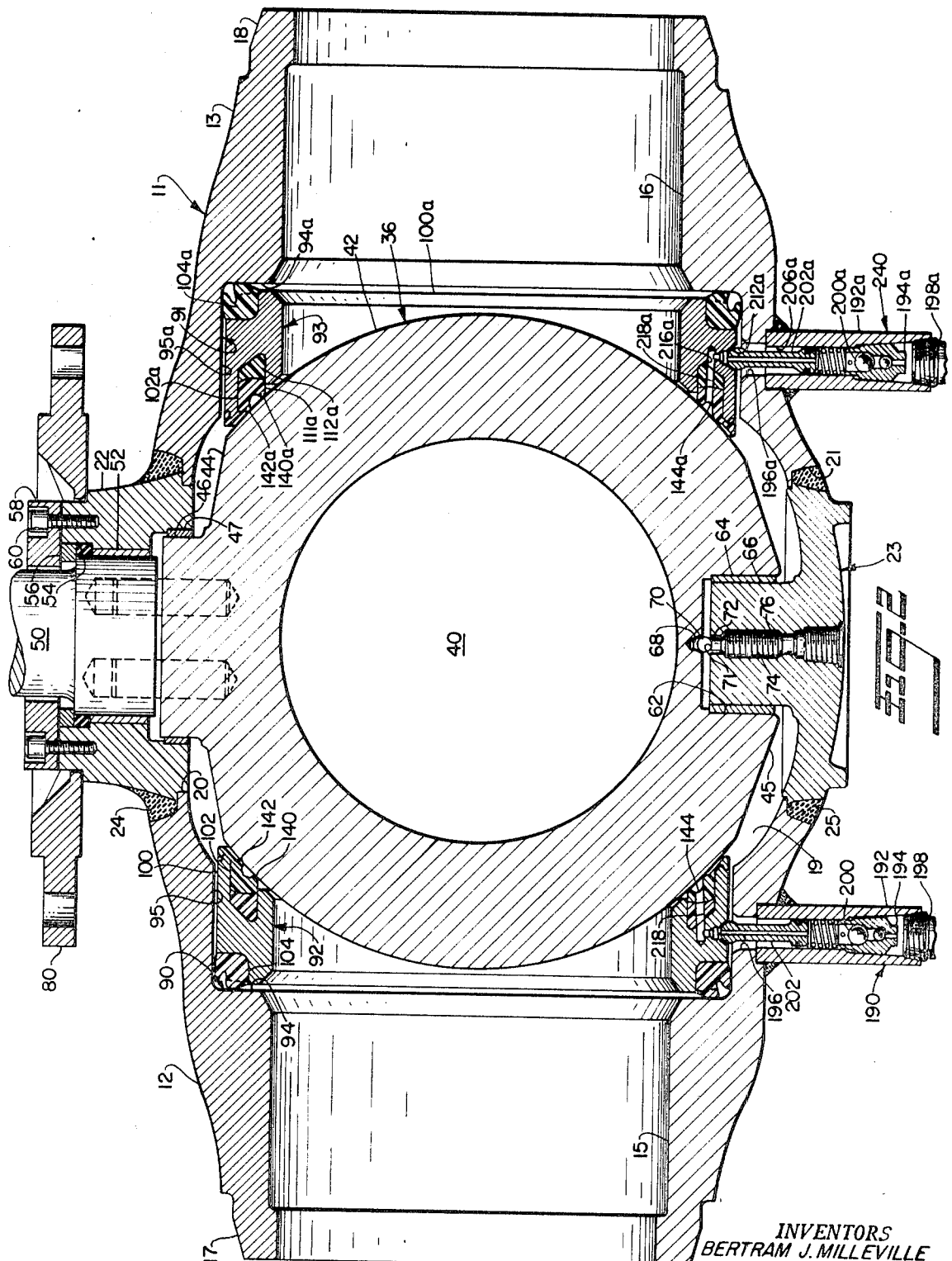

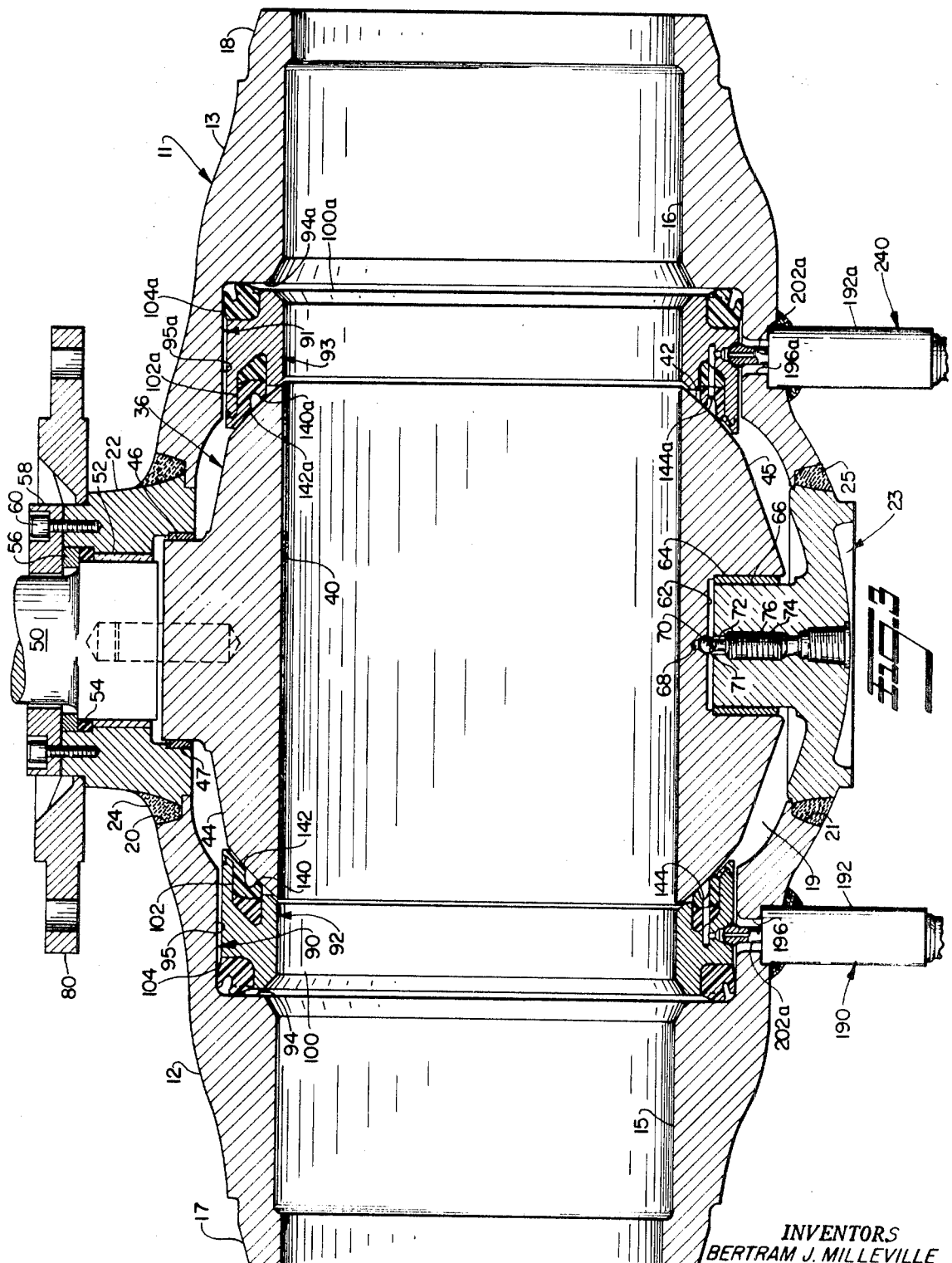

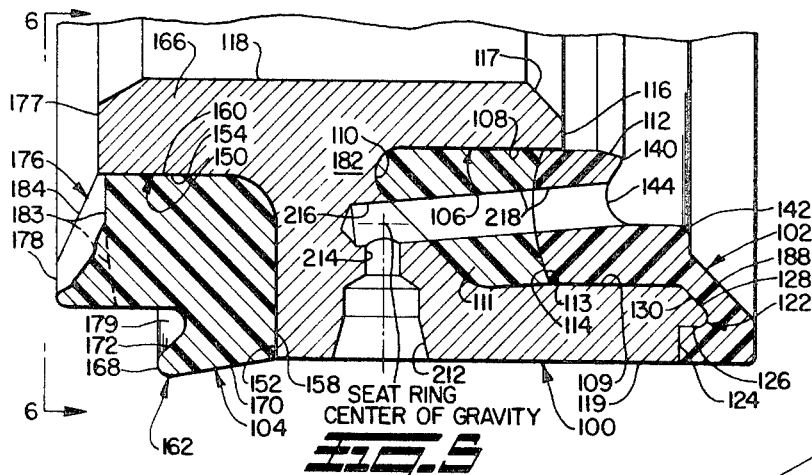
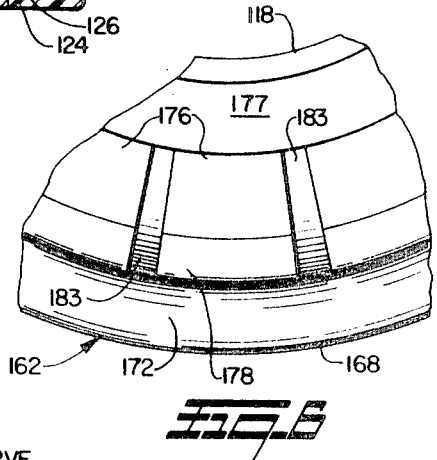
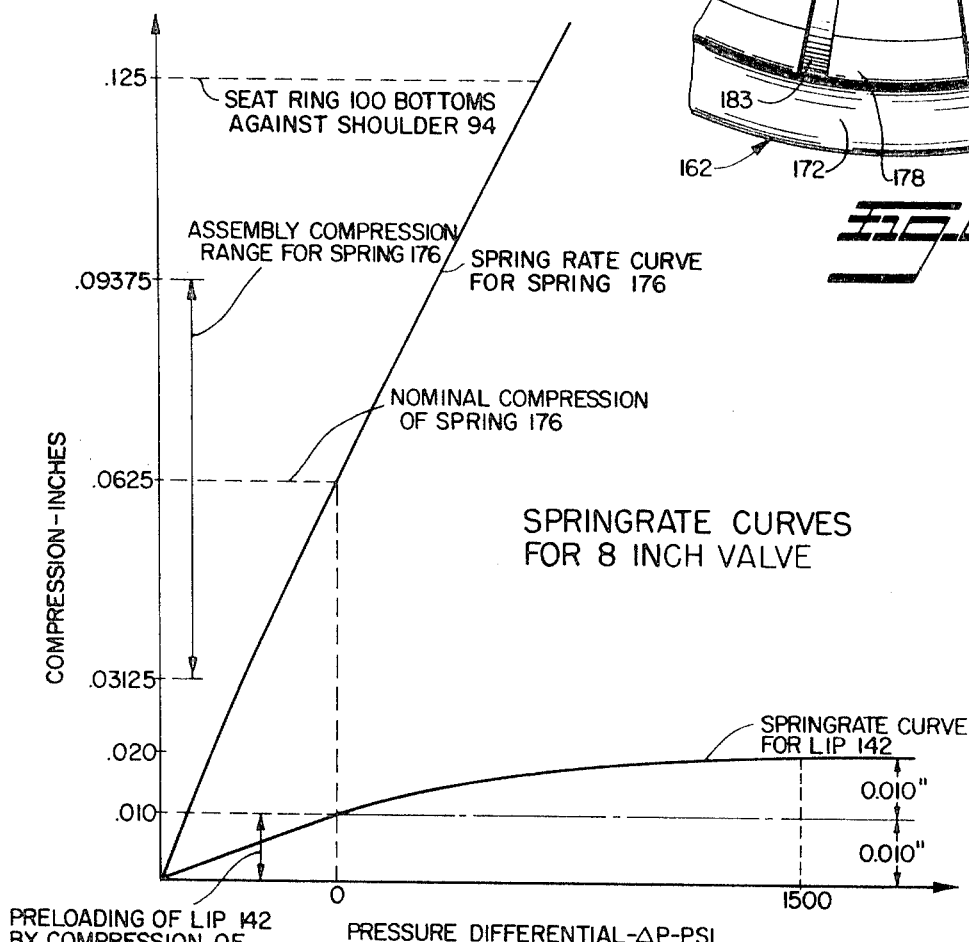

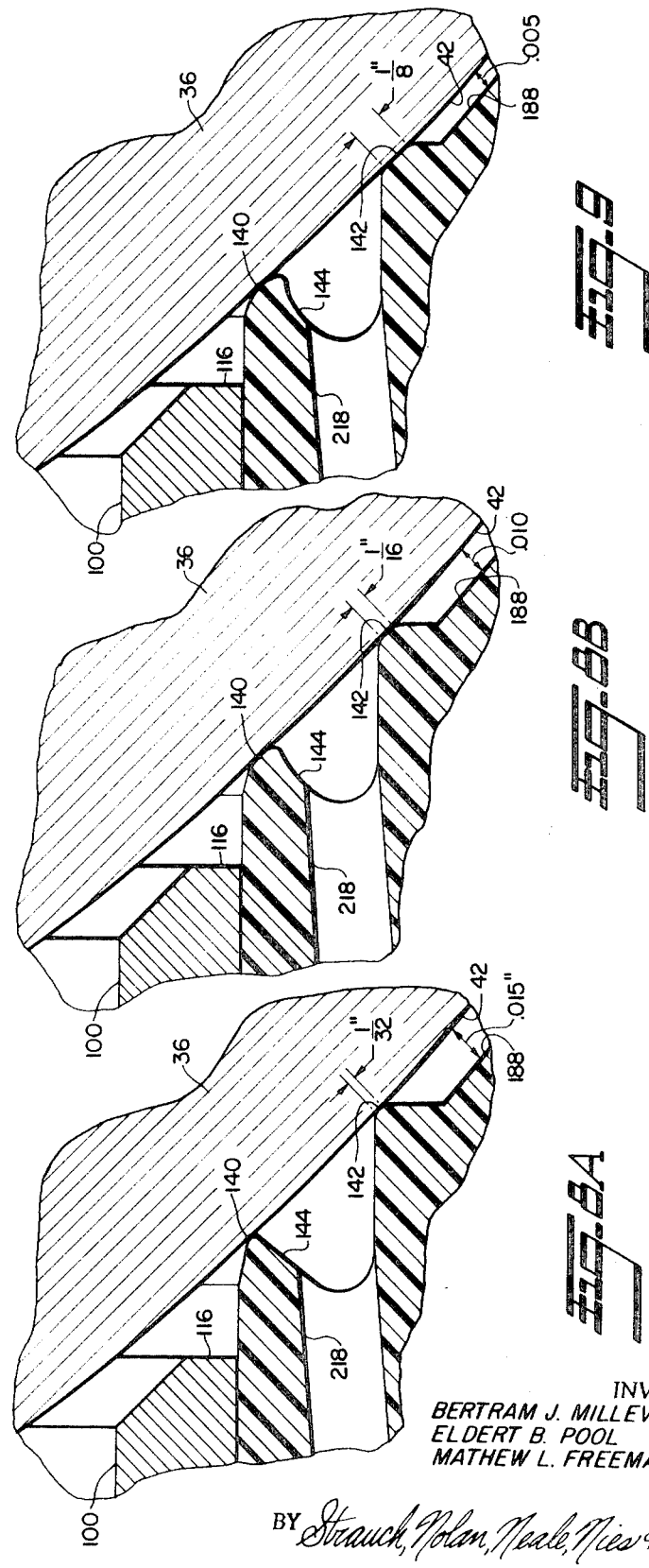

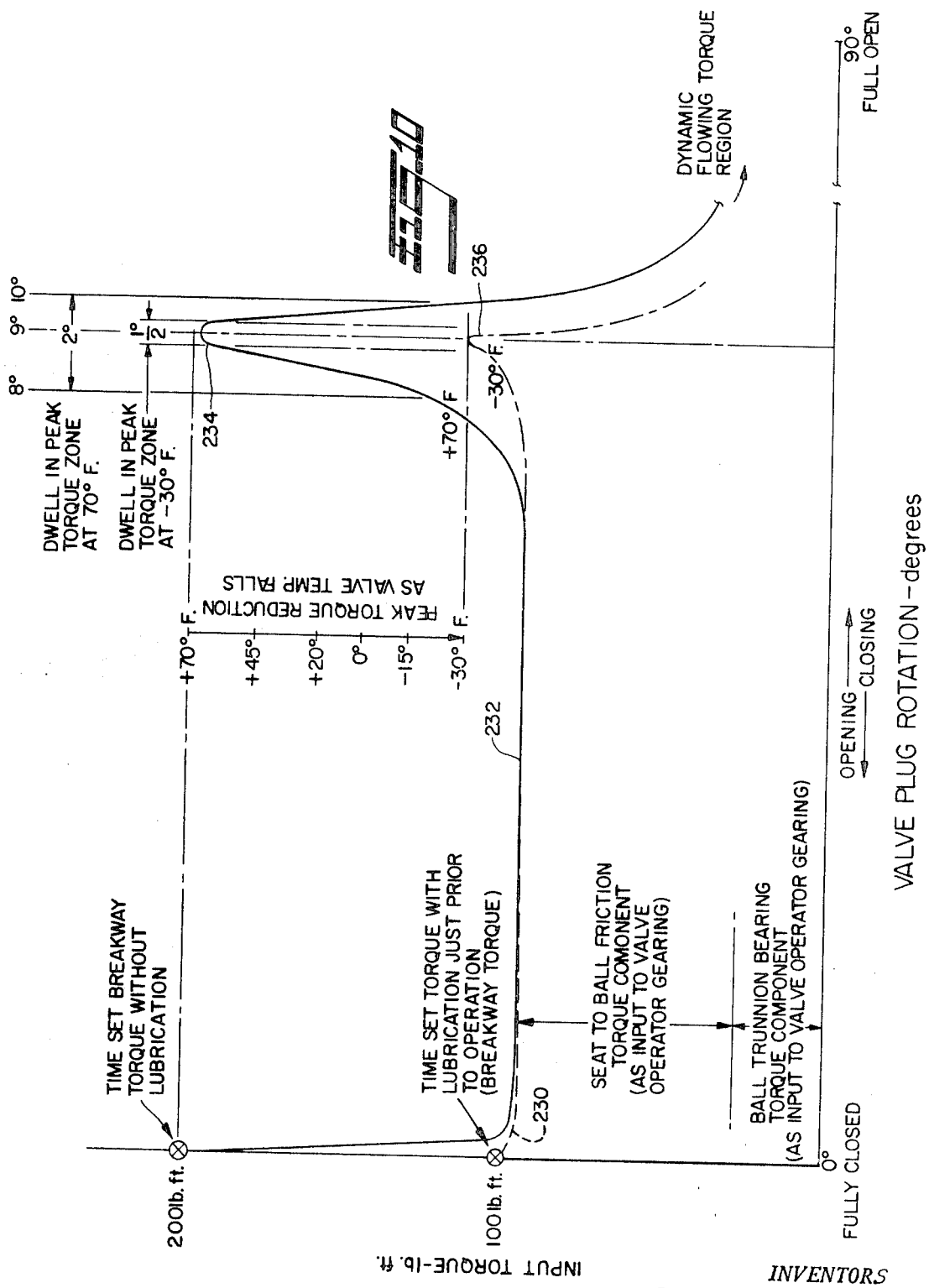

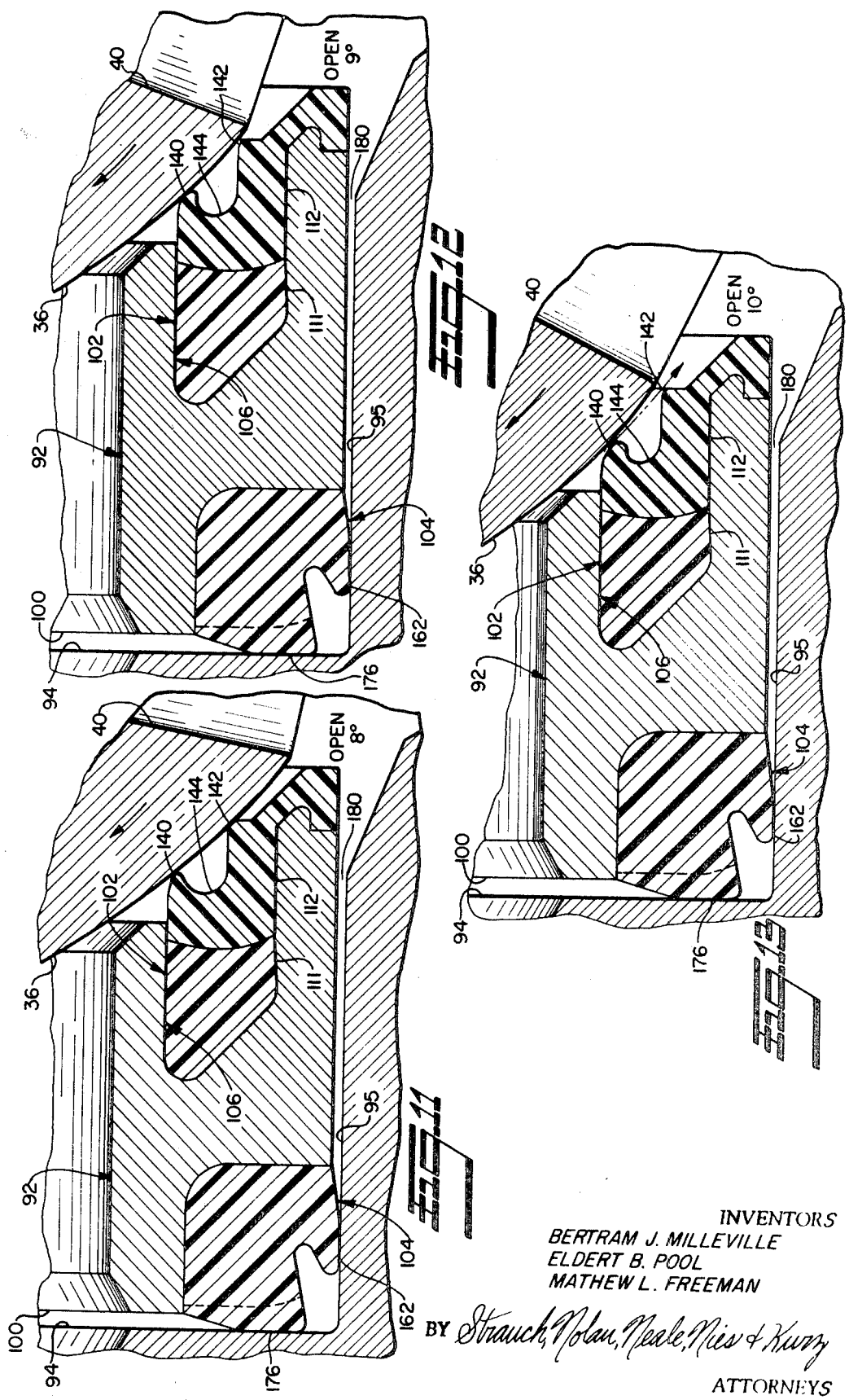

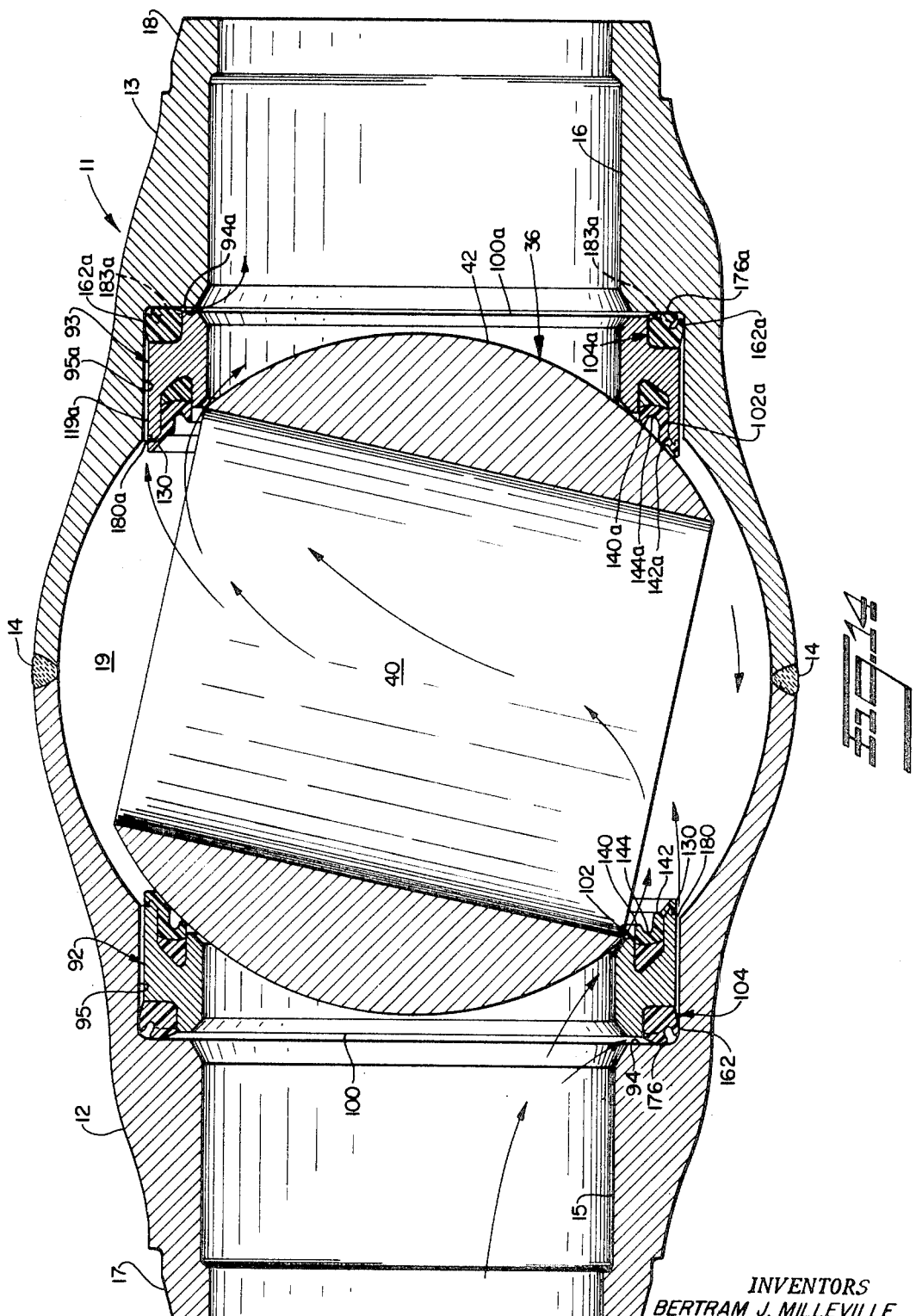

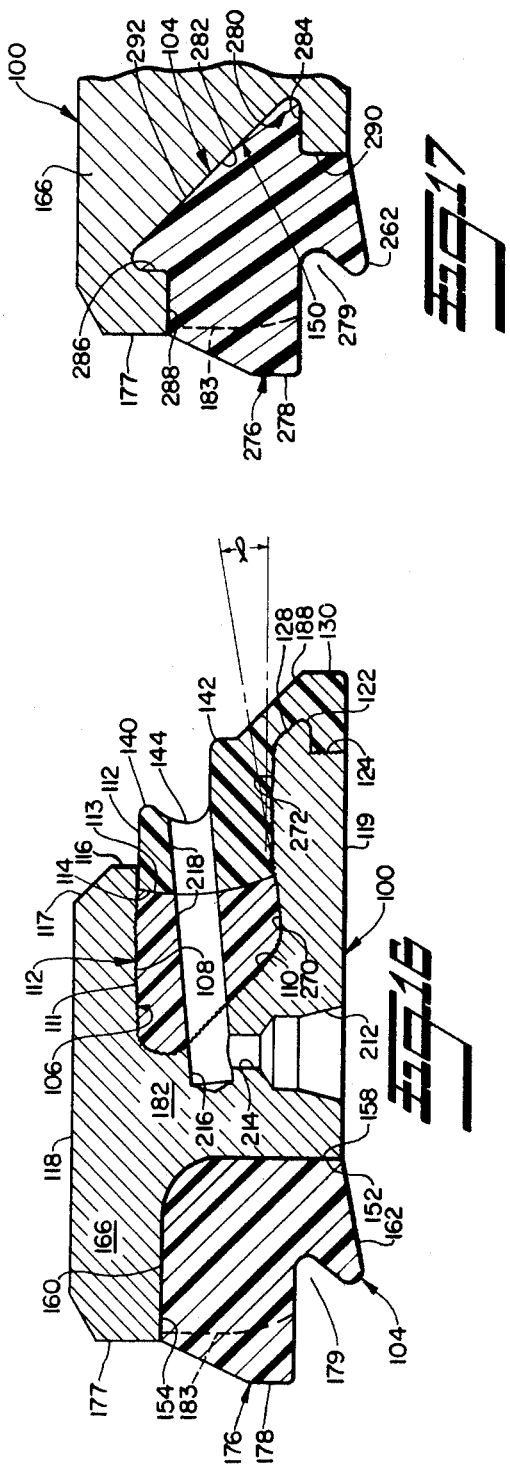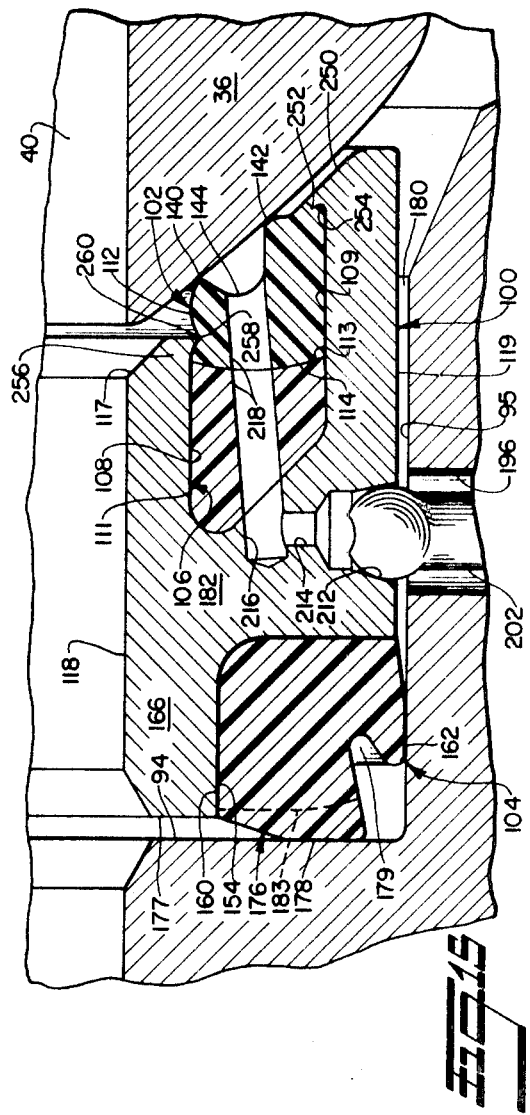
INVENTORS
BERTRAM J. MILLEVILLE
ELDERT B. POOL
MATHEW L. FREEMAN
BY Strauch, Nolan, Neale, Nies & Kurz
ATTORNEYS

LUBRICATED VALVE ASSEMBLY

FIELD OF INVENTION

This invention relates to valves and particularly to plug valves of the type wherein a plug is rotatably mounted on cooperating seat ring surfaces in a valve body. Valves of this type are sometimes referred to as ball valves, and the novel seat ring construction of this invention is particularly applicable, although not limited to, trunnion-type ball valves.

BACKGROUND

The main problems encountered with plug or ball-type valves involve fluidtight sealing at the plug seats and reduction of valve plug turning torque throughout a wide range of operating conditions and particularly for low and high line fluid pressures. Various seat ring configurations and modes of lubrication have been proposed to overcome these problems, but they have not provided uniformly satisfactory results under widely varying pressure and temperature conditions. For example, some valves are satisfactory at low pressure, but may leak, be difficult to turn, or become damaged at high pressures. Other valves may prove to be generally satisfactory for limited high-pressure conditions, but do not function well at low pressures. Also, conventional valves, while sealing within a limited temperature range, are likely to leak or become damaged when subjected to wide variations in temperature.

SUMMARY OF INVENTION AND OBJECTS

The present invention contemplates and has as its primary object a novel valve seat ring construction which effects an extremely tight fluid seal and which provides for a considerable reduction in valve plug turning torque over a wide range of operating conditions. This invention particularly provides a novel valve seat ring structure having great flexibility, considerable strength, and a unique association with the valve plug and valve body to provide for a tight sealing valve both at low and high pressures and to a degree not heretofore obtainable in conventional ball valves.

The foregoing is accomplished essentially by incorporating unique seat-to-valve plug and seat-to-valve body seals into the seat ring structure. In its preferred embodiment, this construction comprises two solid annuli of elastically deformable material. One annulus is anchored in a groove of a rigid seat ring holder and has two annular sealing lips beyond the groove for providing the seat-to-valve plug seal.

The other annulus is anchored in a recess at the opposite end of the seat ring holder and accomplishes two functions. One is to provide a seat-to-valve body seal; the other is to axially bias the seat ring assembly toward the valve plug to compress the sealing lips against the valve plug surface without interfering with the seat-to-valve body seal. The former function is accomplished by a deformable, annular lip which is circumferentially compressed against the internal, cylindrical, passage-forming, valve body surface. The latter is accomplished by providing an annular spring in the form of a land extending in undeformed condition axially beyond the back face of the seat ring holder and being preloaded against an internal, radial, valve body shoulder to provide the axial bias for urging the seat ring assembly toward the valve plug. The spring and seat-to-body sealing lip are integral.

The annular spring is slotted to provide for passage of line fluid at the upstream side of the valve plug to energize the seat-to-body lip seal by compressing it against the valve body and to provide a pressure differential across the seat ring assembly on the upstream side for increasing the compression of the seal-to-valve seal as the upstream pressure increases.

The two seat-to-valve plug sealing lips are so formed and so oriented that on the upstream side of the valve plug, one lip, acting as the primary seal, normally is compressed more and has a greater sealing contact area than the other lip to provide a seal against flow into or out of the valve plug cavity. If this primary seal fails, the force thrusting the seat against the valve plug is automatically increased to effect a transfer of the primary sealing action to the other sealing lip which is of smaller diameter than the primary sealing lip.

The seat-to-valve plug sealing area of the outer, primary sealing lip is relatively small at low pressure, but increases with approximately constant lip compressive stress as the upstream pressure increases within the pressure rating of the valve to increase the thrust on the seat ring assembly. Under the influence of the annular spring, this variable sealing contact area provides a bubbletight seal at extremely low pressure, and as a result of increasing the sealing area as the pressure increases, the bubbletight seal is maintained without overly distorting the primary sealing lip at the greater loads.

From the foregoing, it is clear that another object of this invention is to provide a novel seat ring construction having dual seat-to-valve body sealing lips wherein the primary sealing effect normally provided by one of the lips is transferred, in the event of leakage, to the other sealing lip by increasing the axial thrust applied to the seat ring structure.

A further object of this invention is to provide a novel sealing lip and lubricant arrangement for reducing any time set torque and also for reducing the immediate torque needed for turning the valve plug between its opened and closed positions. Time set torque and immediate torque are defined in the detailed description.

According to this aspect of the invention, an annular lubricant groove is formed between the two seat-to-valve plug sealing lips. Lubricant injected under pressure into the groove causes the seat ring assembly to back off from the valve plug against the bias exerted by the annular spring and any pressure differential existing on the ring. The outer primary lip seals against outward flow of lubricant from the groove. The inner or secondary sealing lip will also seal against fluid flow from the groove, but when the primary lip is operative to effect a fluid tight seal, it allows line fluid to leak into the groove thereby reducing the net effect of the line pressure urging the lips against the valve plug surface.

Accordingly, a more specific object of the invention is to provide a novel seat ring construction which can be jacked or backed off from the valve plug by injecting lubricant under pressure into a groove defined between two annular sealing lips, with the inner lip sealing against flow out of the groove, but allowing leakage of line fluid into the groove.

The foregoing dual lip and lubricant groove seat ring construction also has the effect of reducing the angle of valve plug rotation over which the peak cracking torque occurs. This is accomplished by forming the secondary sealing lip with a cross section that is more narrow than the primary sealing lip and by shaping it so that it more readily deforms into the lubricant groove than in the opposite direction. When the outer primary lip looses its seal by rotating the valve plug toward its cracked-open position, then only a slight additional rotation of the plug is required to cause the inner sealing lip to loose its seal and to thus crack open owing to its thinner cross section and to the capability of upstream line fluid pressure to deform it into the lubricant groove and thus away from the plug surface.

By reducing the valve plug angle over which the peak cracking torque occurs, the inertia of the power valve operator becomes effective to move the valve plug through the peak torque region.

It therefore is a further object of this invention to provide a novel seat ring construction which reduces the valve plug rotation angle over which the peak cracking torque occurs.

Still another object of this invention is to provide a seat ring construction wherein a novel dual composition seat ring insert of elastically deformable material is bonded in a groove of a metallic seat ring holder with greater strength to prevent fracture of the bond over a wide temperature range.

DESCRIPTION OF DRAWINGS

Further objects of this invention will appear as the description proceeds in connection with the appended claims and annexed drawings wherein:

FIG. 1 is a plan view showing a trunnion-type ball valve assembly constructed according to one embodiment of this invention;

FIG. 2 is a longitudinal section taken substantially along lines 2–2 of FIG. 1 and showing the valve in closed position;

FIG. 3 is a longitudinal section like FIG. 2, but showing the valve assembly in opened position;

FIG. 4 is an enlarged fragmentary view of the seat ring construction shown in FIGS. 2 and 3 as it is assembled in the valve body;

FIG. 5 is an enlarged fragmentary section showing the elastically deformable parts of the seat ring assembly of FIGS. 2—4 in undeformed condition;

FIG. 6 is a section taken substantially along lines 6–6 of FIG. 5;

FIG. 7 illustrates the spring rate curves for the primary seat-to-valve plug sealing lip and the elastically deformable spring of the assembly shown in FIGS. 2—5;

FIG. 8A is an enlarged fragmentary view showing the partial compression of the primary and secondary seat-to-valve plug sealing lips at zero or very low fluid pressure differential across the seat ring assembly;

FIG. 8B is an enlarged view like FIG. 8A, but showing the compression of the primary and secondary sealing lips at an intermediate fluid pressure differential between zero and the maximum differential for which the valve is rated;

FIG. 9 is an enlarged view like FIGS. 8A and 8B, but showing the compression of the primary and secondary sealing lips at the maximum fluid pressure differential for which the valve is rated;

FIG. 10 illustrates the input torque curve for opening or closing the valve of FIGS. 1—9;

FIG. 11 is an enlarged fragmentary section illustrating the valve parts with the valve plug opened 8° from its fully closed position;

FIG. 12 is an enlarged fragmentary section like FIG. 11, but showing the position of valve parts when the plug is opened 9° from its fully closed position;

FIG. 13 is an enlarged section also like FIG. 11, but showing the valve parts when the valve plug is opened 10° from its fully closed position;

FIG. 14 is a cross section of the valve of FIG. 1 in a plane extending perpendicular to the valve stem axis and illustrating the positions of both the upstream and downstream seat ring assemblies when the valve plug is turned to its cracked opened position;

FIG. 15 illustrates in cross section a modification of the seat ring shown in FIGS. 4 and 5;

FIG. 16 illustrates in cross section another modification of the seat ring; and

FIG. 17 illustrates in cross section a modified seat ring structure for anchoring the combined, elastically deformable seat ring spring and seat-to-valve body seal.

DETAILED DESCRIPTION

As shown in FIGS. 1—3, the valve of the invention comprises a body 11, having two symmetrical, identically formed, axially aligned, hollow members 12 and 13 permanently secured together by a weld joint indicated at 14 in FIG. 1. Body members 12 and 13 are respectively formed with tubular end portions which define axially aligned fluid flow passages 15 and 16. The outer ends of members 12 and 13 are bevelled at 17 and 18 for welding to a pipeline or the like. The valve, as shown in this embodiment, is a two-way trunnion valve, and, for purposes of this disclosure, passage 15 may be considered to be on the inlet or upstream side, and passage 16 may be considered to be on the outlet or downstream side.

Still referring to FIGS. 2 and 3, the inner ends of body members 12 and 13 are enlarged and are of generally segmental, spherical contour to define a central, essentially spherically shaped plug-receiving cavity 19. At the top and bottom of body 11, the opposed edges of members 12 and 13 are formed with semicircular notches which define top and bottom circular apertures 20 and 21. Apertures 20 and 21 are formed along a common axis which extends medially of cavity 19 and which normally intersects the common longitudinal axis of passages 15 and 16.

An upper valve stem trunnion boss 22 coaxially extends through aperture 20, and a lower trunnion member 23 coaxially extends through aperture 21. An annular weld 24 peripherally and coaxially surrounding aperture 20 and boss 22 rigidly joins boss 22 to body members 12 and 13. Similarly, an annular weld 25 peripherally and coaxially surrounding aperture 21 and member 23 rigidly joins member 23 to body members 12 and 13. Welds 24 and 25 are axially aligned. Weld joint 14, as shown in FIG. 1, is divided into two circumferential girth sections 32 and 33 on opposite sides of body 11. Each of the sections 32 and 33 is joined at opposite ends to welds 24 and 25. Weld sections 32 and 33 are contained in a common plane normally intersecting the common axis of passages 15 and 16.

Disposed within cavity 19 is a ball-type valve plug 36 having a cylindrical through port 40 which is of substantially the same diameter as passages 15 and 16. When the valve is open, as shown in FIG. 3, port 40 is substantially continuous with passages 15 and 16. At its opposite ends port 40 terminates in the spherical surface 42 (see FIG. 3) of plug 36. Surface 42 preferably constitutes the entire outer surface of plug 36 except for the top and bottom relieved areas at 44 and 45.

Port 40 is adapted to align with the inner ends of passages 15 and 16 when plug 36 is in its fully opened position shown in FIG. 3. When plug 36 is located 90° about its vertical axis to its fully closed position shown in FIG. 2, port 40 extends at right angles to passages 15 and 16 to thus block fluid communication between the valve body passages.

At its upper end, plug 36 is formed with a cylindrical section 46 which is journaled in a sleeve bearing 47 and which is nonrotatably fixed by any suitable means to the lower end of a cylindrical valve stem 50. Bearing 47 is seated in the lower end of boss 22.

Stem 50 is journaled by a sleeve bearing 52 in boss 22. A suitable packing 54 or the like, disposed around the upper end of stem 50, is held in place by a spacer ring 56 and a retaining collar 58 to prevent outward leakage of fluid along the valve stem. Collar 58 is detachably secured to boss 22 by capscrews 60 to provide for the renewal of the packing.

At its lower end, plug 36 is formed with a cylindrical recess 62 which is lined with a sleeve bearing 64. Member 23 is integrally formed with a rigid cylindrical trunnion 66 which is coaxially journaled in bearing 64. The bottom floor of recess 62 is formed with a central conical seat 68 which is concentric with the recess and coaxial with the rotational axis of plug 36.

A hard metal, spherical thrust ball 70 is disposed between seat 68 and a concave seat 71 on thrust seat member 72. Member 72 is abutted by the inner end of an adjustment screw assembly unit 74 which is threaded into a tapped central bore 76 of member 23. Screw unit 74 may be rotated to provide a centralized thrust bearing for plug 36.

From the foregoing description, it is clear that plug 36 is rotatable about an axis axially aligning with the axes of stem 50 and trunnion 66 and normally intersecting the longitudinal axes of passages 15 and 16 medially of cavity 19 and perpendicularly with respect to port 40. The upper end of boss 22 is advantageously provided with a flange 80 for mounting an unshown power valve operator that is adopted to operatively be connected to stem 50. Boss 22 and trunnion 66 prevent lateral displacement of plug 36 toward and away from the inner ends of passages 15 and 16.

Surrounding the inner ends of passages 15 and 16 are identical, annular, axially aligned recesses 90 and 91 which respectively slidably receive identically constructed seat ring assemblies 92 and 93. Recess 90 defines the inner end of passage 15 and is formed by a flat-surfaced, annular shoulder 94 and a smooth, uniformly diametered internal cylindrical wall 95 extending axially between shoulder 94 and cavity 19. Wall 95 is formed with a larger diameter than the remainder of passage 15 and is joined thereto by shoulder 94 which faces cavity 19 and which extends radially with respect to the longitudinal flow passage axis.

The corresponding surfaces defining recess 91 are identified by like reference numerals suffixed by the letter *a*.

As best shown in FIGS. 4 and 5, seat ring assembly 92 consists of a rigid, metallic seat ring 100, an elastically deformable, annular seat ring insert 102, and an annular, elastically deformable, combined spring and seat ring-to-valve body sealing member 104. Insert 102 is coaxially seated in a deep, annular groove 106 which is formed in seat ring 100 and which opens axially toward plug 36.

Groove 106 is formed with opposed, concentric annular sidewalls 108 and 109 and a bottom wall 110. Insert 102, as will be described in greater detail shortly, is made from an elastically deformable material and is molded in a solid mass into groove 106. As shown, insert 102 is firmly bonded to walls 108—110, completely fills groove 106, and engages plug 36 to provide a seat ring-to-valve plug seal circumferentially surrounding the inner end of passage 15. The material-forming insert 102 is preferably relatively hard polyurethane. Seat ring 100, which acts as a holder for insert 102 and member 104, is made from a suitable metal such as steel. Walls 108—110 may be roughened to increase the bonding strength for insert 102.

It was found unexpectedly that relatively hard polyurethane seat ring inserts as compared with other elastically deformable materials, provided significant advantages. In this respect, it is tougher, stronger, and easier to permanently bond to metal in comparison with other elastically deformable materials. In addition, polyurethane, while being tougher and harder, is as elastically deformable as softer rubbers and, as compared with different materials of the same hardness, is more capable of resuming its original shape without permanent deformation. Teflon, for example, tends to become permanently deformed to impair the effectiveness of the seal if heavily loaded.

As compared with softer grades of polyurethane, the relatively hard grade employed in the seat ring insert of this invention more effectively maintains its shape, deflects less, is easier to retain in place, is more durable in service, and is less subject to flutter under dynamic loading conditions. The reduced deflection attributable to the polyurethane insert of this invention is particularly important because it guarantees an effective separation of the seat from the valve plug. Also, any coating applied to plug 36 is not likely to be damaged. Furthermore polyurethane is exceptionally resistant to wear and abrasion to thus provide for a longer lasting seat.

It is known that the thermal coefficient of expansion of elastomeric materials such as polyurethane is appreciably greater than the thermal coefficient of expansion of metals such as steel. As a result, variations in temperature over a wide range such as, for example, from −40° F. to +180° F., may fracture the bond between solid polyurethane and metal.

To minimize this objectionable condition and thus extend the effective operating temperature range of the valve, insert 102, according to one aspect of this invention, is formed with a dual composition consisting of two annular, axially aligned sections 111 and 112. Both section 111 and section 112 are formed from the same elastically deformable material, namely, polyurethane, with section 111 being molded into the inner part of groove 106 and section 112 being molded into the outer part of groove 106 over section 111.

Section 111 differs from section 112 in that it is filled with a rigid material that reduces its thermal coefficient of expansion to some intermediate value between the thermal coefficient of the elastically deformable material making up the entirety of section 112 and the thermal coefficient of the metal from which seat ring 100 is fabricated.

One example of a suitable rigid material for providing this reduction in the thermal coefficient of expansion of section 111 is glass fibers which may be uniformly and densely dispersed throughout the polyurethane body. Of course, other suitable, rigid material effecting the desired reduction of thermal coefficient of expansion may be used in place of glass fiber. Glass fiber or like material also has the effect of reinforcing section 111.

Another desirable property of section 111 is that of reinforcing the metal seat ring 100. The metal section of ring 100 defined by edges 109 and 119, which extends out to the end defined by lip 122 and shoulder 124, is subjected to considerable forces acting upon it, for example hoop stresses. The section 111 acts to reinforce this metal section, minimizing the strains which occur due to these forces.

Section 111 is bonded along the entire area of bottom wall 110 and along the entire circumferential interfaces defined between wall 108 and the inner periphery of section 111 and between wall 109 and the outer periphery of section 111. Section 111 terminates in an annular concave surface 113 facing axially toward cavity 19 and interfitting with a convex surface 114 on section 112. Both wall 108 and wall 109 extend axially beyond surface 113 to provide internal circumferential groove surfaces along which section 112 is bonded.

Section 112, which is solid and which is formed entirely from polyurethane, is also permanently bonded to section 111 along the entire interface between surfaces 113 and 114. The related contours of surfaces 113 and 114 insure a strong bond opposing fracture especially under the influence of temperature changes and the shear force applied to insert 102 as a result of turning plug 36 between its opened and closed positions.

Owing to its reduced thermal coefficient of expansion, section 111 is capable of maintaining its bond with ring 100 over a wider range of temperature changes as compared with an insert formed only from elastically deformable material. For example, the bond between section 111 and ring 100 and the bond between sections 111 and 112 will be maintained for temperatures at least ranging from −40° F. to +180° F. because the linear coefficient of thermal expansion of section 111 is intermediate between that of section 112 and that of ring 100. Section 111 therefore retains section 112 anchored in groove 106 even if the bond between section 112 and ring 100 is fractured as a result of an extreme change in temperature.

It is undesirable to form the entire insert from the composition of section 111 because it has a compression set recovery which is too low to be used on the seal face against plug 36. The dual composition insert of this invention therefore provides both a firm anchor to the metallic seat ring and a seal with good recover characteristics over an expanded temperature range.

Still referring to FIGS. 4 and 5, the end of seat ring 100 extending radially inwardly from groove 106 is formed by a flat annular surface 116 and a conical surface 117. Surface 116 is in a plane extending normally with respect to the longitudinal axis of ring 100, and surface 117 provides the juncture between surface 116 and the uniformly diametered, cylindrically smooth, internal peripheral seat ring surface at 118. Ring 100 is formed with an outer, uniformly diametered peripheral surface 119 which is concentric with surface 118.

As shown, section 112 extends axially beyond surface 116 and has an internal diameter which is not smaller than the diameter of sidewall 108. Surfaces 116 and 117, which are spaced from plug 36, are therefore exposed to line fluid pressure in passage 15 for a purpose to be explained in detail shortly.

The end of ring 100 extending radially outwardly from groove 106 is cut away to define an annular axially projecting lip 122 and an axially recessed, radially extending annular shoulder 124. Lip 122 is formed with an outer, cylindrically smooth, circumferential surface 126 extending axially toward cavity 19 from shoulder 124. The tip of lip 122 is rounded and joins surface 126 to a conical surface 128 defining the inner periphery of the lip. Surface 128 diverges from wall 109.

According to another feature of this invention, section 112 is integrally formed with an annular extension 130 which is molded around lip 122 and which fills the annular cutaway, seat ring portion defining shoulder 124. Extension 130 is thus wrapped or hooked around lip 122 and is bonded to both sides of lip 122 and to shoulder 124 as shown. This prevents section 112 from bending toward plug 36 during operation of the valve. As a result, extension 130 is effective to reduce the strain on the bond of section 112 to ring 100 and to section 111.

Without the strain relief afforded by extension 130, fluid pressure outside of the downstream seat ring tends to bend the elastomeric seat ring insert into plug 36 to maintain a seal as the seat backs away from ball 36. As a result, pop-off on the downstream side may not occur. The seat ring insert would consequently be severely strained as it takes about 90 percent of the total valve pressure drop under this condition. The back-off and pop-off action of the downstream seat ring assembly will be described later on.

Section 112 is formed with a primary, annular sealing bead or lip 142 and a secondary, annular sealing bead or lip 140. An annular axially opening groove 144 is defined between lips 140 and 142, and lips 140 and 142 and groove 144 are all coaxially formed in the insert and are each of uniform diameter.

Lip 140 is formed at the inner circumferential corner of section 112, and lip 142 is formed between groove 144 and extension 130. As shown, lip 140, which is smaller in diameter than lip 142, is formed at the inner side of groove 144, and lip 142 is formed on the outer side of the groove. Lip 142 is disposed axially forwardly of lip 140, and the lip construction is so dimensioned that both tips of lips 140 and 142 will engage plug 36. However, lips 140 and 142 are compressed against plug 36 to different degrees as will be described in detail later on.

The outer corner of seat ring 100 adjacent to shoulder 94 is cut away to define an annular recess 150 for receiving spring member 104. Recess 150 opens radially outwardly toward wall 95 and also axially toward shoulder 94 and is defined by a flat annular surface 152 and a cylindrically smooth, uniformly diametered peripheral surface 154 which is smoothly joined to surface 152 by an arcuate corner surface. Surface 152 extends radially inwardly from surface 119 and is contained in a plane, which normally intersects the longitudinal seat ring axis. Surface 154 is coaxial with the longitudinal seat ring axis and, consequently, concentric with the inner and outer peripheral surfaces 118 and 119 of the seat ring. Groove 106 also is concentric with surfaces 118 and 119.

Spring member 104, as shown in FIG. 4, is a solid, integral, molded, annular part which is preferably made from polyurethane and which is formed with radial and cylindrical surfaces 158 and 160 which interfit with the seat ring surfaces 152 and 154 respectively. Member 104 completely fills recess 150 and is securely bonded to surfaces 152 and 154 throughout its entire area of contact with seat ring 100.

According to this invention, member 104 is integrally formed with a circumferential seal lip 162 which is capable of being flexed by line fluid pressure and which is in the form of an annulus. Lip 162 extends axially rearwardly and radially outwardly from surface 158 so that in the cross section shown in FIG. 4 a line medially intersecting lip 162 extends at an acute angle with respect to the longitudinal axis of seat ring 100.

As shown, lip 162 circumferentially surrounds the end section 166 of seat ring 100 defining the base of recess 150. The free rounded end 168 of lip 162 extends toward shoulder 94 and in its undeformed condition shown in FIG. 5 projects radially beyond the outer periphery of seat ring 100. Lip 162 is defined by outer and inner peripheral surfaces 170 and 172 which diverge from end 168. Surface 170, which is adapted to seal against wall 95, slopes uniformly from end 168 to the region where it intersects surface 158. At this point, the outer diameter of member 104 is equal to the outer diameter of seat ring 100.

As shown in FIG. 5, the angle defined between surface 172 and the longitudinal axis of ring 100 is considerably greater than the angle defined between surface 170 and the seat ring axis when member 104 is undeformed.

Member 104 is also integrally formed with a spring 176 which is in the form of an annular extension and which is adapted to resiliently be compressed against shoulder 94 for axially biasing seat ring assembly 92 toward plug 36. When unflexed, spring 176, as shown in FIG. 5, projects axially rearwardly of the seat ring end face at 177 and has a flat, annular, radially extending seating surface 178 contained in a plane which normally intersects the longitudinal seat ring axis. Surface 178 engages shoulder 94 as shown in FIG. 4.

Formed between lip 162 and spring 176 is an annular groove 179 which opens outwardly toward shoulder 94 and the internal corner of the valve body between shoulder 94 and wall 95. When lip 162 is compressed against surface 95, it will deform into groove 179. Spring 176, when compressed against shoulder 94, also will deform somewhat into groove 179. The configurations of lip 162, spring 176, and groove 179, however, are such that lip 162 and spring 176, when deformed, do not interfere with each other.

The axial distance between shoulder 94 and the spherical plug surface 42 is made sufficiently short that when assembly 92 is mounted in the valve body, spring 176 will be compressed uniformly throughout its circumference against shoulder 94 and deformed slightly into groove 179 to resiliently urge seat ring assembly 92 toward plug 36 and to a position where lips 140 and 142 engage and are compressed against the plug surface. As a result, lip 142 is preloaded or presqueezed to provide an initial, fluidtight, seat-to-plug seal in absence of line fluid pressure. Lip 140, which provides the secondary seal, also will be preloaded but to a lesser degree than lip 142.

The outer diameter of seat ring 100 at surface 119 is slightly less than the internal valve body diameter at wall 95 to provide a small radial clearance at 180 (FIG. 4). Clearance 180 enables seat ring assembly 92 to shift into alignment with plug 36 when plug 36, upon assembly in the valve body, does not accurately align with passages 15 and 16. In this connection, two types of misalignment may be encountered during assembly of plug 36 in body 11.

One is where the axis of port 40 is parallel to, but laterally offset from the common axis of passages 15 and 16. The other is where plug 36 is so cocked that the axis of port 40 will be at an acute angle to the common axis of passages 15 and 16.

Clearance 180 allows seat ring assembly 92 to shift radially or to cock relative to passage 15 to maintain alignment with plug 36 in circumstances where the plug axis is either offset or cocked relative to the longitudinal axis of the passage.

Clearance 180 also provides an assembly tolerance in the event the wall 95 distorts upon assembly welding.

When assembly 92 is centered with respect to the longitudinal axis of passage 15, lip 162 will be compressed throughout its circumference against wall 95 and thus flexed slightly into groove 179. Assembly 92 therefore effectively floats radially on lip 162, and the flexure of this lip allows limited radial displacement of assembly 92 for alignment with plug 36. As one example, clearance 180 may be about 0.020 inch when assembly 92 is exactly concentric with wall 95, and lip 162 may engage surface with a 0.045-inch interference fit. Assembly 92 therefore may shift radially by a distance of 0.020 inch to establish metal-to-metal contact between seat ring 100 and the valve body, while still maintaining a minimum interference fit of 0.025 inch between lip 162 and wall 95. It is important that this lip interference fit be preserved to ensure that the seat to valve body seal provided by lip 162 is maintained for all positions which assembly 92 is capable of shifting to as a result of providing for clearance 180. The fit afforded by clearance 180 is comparatively loose and greater than the minimum clearance needed for allowing axial displacement of seat ring 100.

Surface 178, as best shown in FIG. 5, is formed on an annular land having an inwardly sloping face 184 intersecting with surface 160 at a corner which is in the plane of surface 177. The region of member 104 at the junction between surface 160 and face 184 is subject to less axial compression as compared with the compression at surface 178. This reduced compression minimizes the load on the bond at the interface between surfaces 154 and 160.

As shown in FIG. 6, spring 176 is provided with a series of angularly spaced apart, deep radial grooves or slots 183 establishing fluid communication between passage 15 and groove 179. Upstream fluid under pressure therefor enters groove 179 and acts against surface 172 to firmly compress lip 162 into tight sealing engagement with the valve body.

Grooves 183 extend into member 104 to a greater depth than the region where a plane containing end face 177 intersects spring 176. This allows line fluid to enter groove 176 and to thus load lip 162 even though end face may be backed up against shoulder 94. In this connection, the surface finishes of end face 177 and shoulder 94 are rough enough so that if they abut, sufficient line fluid can flow into grooves 183 and thus into groove 179 for maintaining the pressure needed to load lip 162. In the event grooves 183 become fouled or clogged, the pressure buildup in passage 15 will eventually deform spring 176 and flow past surface 178 to load lip 162.

Line fluid pressure along spring 176 and in groove 179 tends to outwardly deform member 104 at the corner between surfaces 170 and 158. However, extrusion of this corner into clearance 180 where it can be pinched and thus damaged is prevented by bonding member 104 to ring 100 in the manner previously described.

When spring 176 is compressed upon assembly of the valve, it applies a constant axial thrust on seat ring 100 to urge insert 102 into engagement with plug 36. This thrust is greater than the resistive frictional force created by the compression of lip 162 against the valve body. In an 8-inch valve, for example, spring 176 exerts a thrust which approximately equals 15 percent of the total thrust on the seat ring when the pressure differential across the seat is about 1,500 p.s.i.

Member 104, according to another aspect of this invention, is made from a softer polyurethane as compared with that used for sections 111 and 112 of insert 102. In this embodiment, member 104 has a durometer hardness of about 90 on the A-scale, whereas section 112 has a durometer hardness of about 65 on the D-scale, and section 111 has a durometer hardness of about 70 also on the D-scale. Section 112 is relatively stiff to ensure that plug 36 does not contact the metal seat ring 100 and also to provide a sufficiently high sealing lip unit compressive stress for ensuring a bubbletight seal against the plug surface. Member 104 does not have to be as stiff as section 112 since it is not desired to avoid contact between seat ring 100 and either shoulder 94 or wall 95 in the valve body. Furthermore, it is advantageous to form member 104 from softer polyurethane since the range over which spring 176 is compressible is thereby considerably increased to more effectively accommodate the rather large range over which the axial dimension between shoulder 94 and plug 36 varies from valve to valve. In this connection, it is apparent that the axial spacing between shoulder 94 and the surface of plug 36 will vary from valve to valve depending upon the tolerance of valve parts and also upon the degree of weld shrinkage encountered when the weld joint 14 is formed and cooled. On the other hand, member 104 must be sufficiently stiff to prevent extrusion or pinching.

As shown by way of example in FIG. 7, spring 176, owing to its relative softness is axially compressible over a wide range extending from 0.03125 inches to 0.09375 inches during assembly of the valve and has a maximum axial compression of 0.125 inches where end face 177 bottoms against shoulder 94. If a stiffer spring were employed, this spring compression range available for assembly of the valve parts would correspondingly be reduced, thus becoming more critical and requiring greater control during manufacture over the variation in spacing between shoulder 94 and the outer plug surface. As a result, the tolerance of the valve parts would have to be smaller and the greater control over the shrinkage of weld joint 14 would be needed. This, however, is undesirable, for it increases manufacturing costs.

For the assembly compression range shown in FIG. 7, a nominal compression of about 0.0625 inches is expected. This leaves about 0.0625 inches (about 50 percent of the total compression range of spring 176) left over to allow seat ring assembly 92 to back away from plug 36 for effecting a pop-off action.

As shown in FIG. 7, the slope of the spring rate curve for spring 176 is considerably greater than that for the relatively stiffer primary sealing lip 142. At the nominal compression of spring 176 and at zero pressure differential across assembly 92, for example, the compression of lip 142, which is caused by engagement of spring 176 with shoulder 94, will be about 0.010 inches. This preloaded condition is best shown in FIG. 8A. For an 8-inch valve, there will be about 120 pounds per linear inch of seating force on lip 142 at zero pressure differential across assembly 92. This is about 50 percent of the total compression range of lip 142 against plug 36. In this connection, the spring rate curve of lip 142 becomes almost horizontal at a compression of about 0.020 inches. From this, it is apparent that the spring rates of spring 176 and lip 142 are carefully correlated so that both are compressed about 50 percent of their respective ranges at the same pressure differential value.

The foregoing relationship of spring and primary sealing lip compression upon assembly of the valve parts is effective to provide a tight seat-to-plug fluid seal at zero or low fluid pressure differentials across the seat.

From its nominal, presqueezed or preloaded condition, lip 142 may then be compressed another 0.010 inches, or it may reexpand up to 0.010 inches to seal against valve plug imperfections, distortions, or both. Lip 142 furthermore has sufficient energy stored in it to seal around inclusions, such as sand grains and scale flakes, and still maintain a sufficient seal compressive stress to seal bubbletight both at low and high line fluid pressures. For the values previously mentioned, lip 142 will be compressed to almost a maximum of about 0.020 inches when the pressure differential across assembly 92 in an 8-inch valve reaches a maximum rating of approximately 1,500 p.s.i.

Referring again to FIG. 5, lip 140, in cross section, is much thinner and less rounded as compared with lip 142. In cross section lip 140 approaches a pointlike configuration. Lip 140 at zero or low-pressure fluid differential across seat ring assembly 92 will be compressed lightly against plug 36 and to a lesser extent than lip 142. Consequently, the compressive stress in lip 140 will be less than the compressive stress in lip 142. Lip 142 therefore provides the primary bubbletight seat-to-plug seal unless certain conditions, which will be explained later on, occur. Owing to its rounded curvature and its thicker cross section, lip 142 will seal against plug 36 along a bandlike contact area having a greater width than that of the contact area between lip 140 and the plug surface. When lip 142 seals against plug 36, it normally keeps lip 140 from being greatly compressed against the plug surface. Distortion of lip 140 and its width of sealing contact area with plug 36 are therefore limited when lip 142 seals against the plug surface.

The unit sealing lip compressive stress normally increases as the fluid pressure differential across seat ring assembly 92 increases, but decreases as the area of lip-to-valve plug seal increases. If the compressive stress is too low, leakage will occur. It therefore is necessary to maintain the unit compressive stress high enough in order to provide a bubbletight seal throughout the pressure operating range for which the valve is designed. On the other hand, the unit compressive stress cannot be so high as to cause damage or to result in excessively high turning torques. The fluid pressure differential, hereinbefore referred to, is the difference between the line fluid pressure upstream of the seal provided by insert 102 and valve plug cavity pressure on the downstream side of the seal.

The sealing area between lip 142 and plug 36 increases considerably and as a nonlinear function with respect to the fluid pressure differential increase across assembly 92. This has the effect of maintaining the compressive stress in lip 142 approximately constant as the fluid pressure differential across assembly 92 is built up above a predetermined magnitude and within the rated operating range to increase the axial load thrusting insert 102 toward plug 36.

In an 8-inch valve where lip 142 is compressed 0.010 inches by spring 176 at zero pressure differential as indicated in FIG. 7, the contact area between lip 142 and plug 36 will be about one thirty-second of an inch wide as shown in FIG. 8A, and the compressive stress in lip 142 will be about 4,000 p.s.i. When the fluid pressure differential thrusting insert 102 against plug 36 increases to about 750 p.s.i. as shown in FIG. 8B, the width of the sealing area between lip 142 and the plug surface doubles to about one-sixteenth of an inch owing to the rounded lip curvature, and the compressive stress in lip 142 will increase to about eight times the pressure differential or about 6,000 p.s.i.

When the pressure differential across assembly 92 is increased further to its maximum rating of about 1,500 p.s.i., the width of the sealing area between lip 142 and the plug surface, as shown in FIG. 9, will increase to about one-eighth of an inch as a result of compressing lip 142 to about 0.020 inches. The increase in the area of sealing contact will therefore be disproportionate to the pressure differential increase, and the compressive stress to which lip 142 is loaded at 1,500 p.s.i. will consequently remain at about 6,000 p.s.i. The dimensions, configuration, and stiffness of lip 142 are such that the compressive stress will be limited in this manner.

From the foregoing example, it is apparent that the compressive stress in lip 142 will remain approximately constant as the pressure differential across assembly 92 is increased from a predetermined value to the maximum differential pressure rating of the valve. Furthermore, the ratio of the compressive stress in lip 142 to the pressure differential decreases as the pressure differential increases above a predetermined amount, for the compressive stress as exemplified by the foregoing example is only four times the pressure differential at 1,500 p.s.i., but eight times the pressure differential at 750 p.s.i. Overloading or overstressing of lip 142 is thereby avoided.

Owing to its durometer hardness and relatively thick cross section, lip 142 eventually becomes sufficiently stiff at the maximum differential pressure rating of the valve to maintain a slight standoff from the annular surface 188 (see FIG. 9) of the material supporting the lip. In this way, the area of contact between lip 142 and plug 36 is not increased excessively by contact with surface 188. As a result, reduction of the lip compressive stress to a value that may allow leakage is avoided at pressure differentials not exceeding the rating of the valve.

As shown in FIGS. 4, 8A, 8B, and 9, surface 188 extends outwardly from the base of lip 142 and defines the inner periphery of extension 130. For an 8-inch valve, lip 142 is formed with a relaxed or free height of about 0.025 inches as measured radially between surface 188 and plug 36 when section 112 is made from polyurethane having a durometer hardness of about 65 on the D- scale. Thus, when lip 142 is compressed 0.020 inches at the maximum pressure differential rating of the valve, a minimum clearance of 0.005 inches will be maintained between surface 188 and plug 36. Therefore, only lips 140 and 142 of assembly 92 will contact plug 36 under normal operating conditions.

If the maximum pressure rating is, for some reason, exceeded during operation of the valve, lip 142 will be compressed further until it flattens sufficiently to allow surface 188 to contact plug 36. The considerable increase in sealing area contact which results has the effect of limiting the compressive stress to thus maintain it below the rupture stress of the sealing lips. Although leakage may occur as a consequence of limiting this compressive stress by contacting surface 188 with plug 36, damage to insert 102 is avoided. When the pressure differential is reduced to a value within the rating of the valve, lip 142 will recover to reestablish a tight seal.

As best shown in FIGS. 4 and 5, the surfaces of lip 140 slope in opposite directions relative to the longitudinal seat ring axis. The slope of the lip surface nearest the seat ring axis (the inner periphery), is small and appreciably less as compared with the slope of the outer peripheral surface. This provides a greater amount of elastomeric material supporting lip 140 against outward deflection, or toward the lubricant groove 144. As clearly shown in FIGS. 4 and 5, the conical surface 117 of seat ring 100 is truncated at surface 116. This has been done to additionally facilitate the tendency of lip 140 to flex inwardly into passage 15. The combination of the shape of lip 140 with the truncated support of seat ring 100 allows lip 140 to flex or deform inwardly into passage 15. It can readily be seen however, that this flexing moves lip 140 more solidly into engagement with the spherical surface of ball 36. Thus, any pressure in groove 144 urges lip 140 into tighter engagement with ball 36.

On the other hand, lip 140 resists deformation in the direction of groove 144, due to the greater amount of elastomeric material on that side of the lip. In effect, lip 140 is capable of sealing against pressure buildup only in one direction when lip 142 is operative to provide the primary seal, whereas lip 142 seals in both directions. The showing of FIGS. 8–A, 8–B, and 9 while apparently contradicting this merely illustrates the flexing caused by the relative movement between seat ring 100 and ball 36, the slope of the ball surface relative to the line of movement of the seat ring forcing lip 140 into the shapes shown.

When plug 36 is closed, lip 142 provides a bubbletight seal preventing leakage of upstream fluid into cavity 19, and line fluid pressure in passage 15 acts over the entire annular end face of assembly 92 adjacent to shoulder 94. This end face area includes end face 177 of ring 100, spring 176 and the inner seat-to-body sealing lip surface 172. The total axial thrust urging seat ring assembly 92 toward plug 36 will therefore be the line fluid pressure times the summation of the end face areas mentioned above. This axial thrust is opposed by line fluid pressure acting along surfaces 116 and 117 and in groove 144 and also by any plug cavity pressure acting along the surface of extension 130 exposed in cavity 19. Lip 140 will allow line fluid to enter groove 144, but lip 142 maintains its bubbletight seal under normal conditions.

Since the cavity pressure 19 vents to the downstream side of the valve in a manner to be described later on, the fluid pressure in cavity normally is of a value at least approaching zero and therefore may be neglected when compared with the upstream pressure which normally is appreciably greater. The difference in annular seat ring end face area over which a net upstream line pressure acts therefore extends along the back face of assembly 92 from a minimum diameter equal to the diameter of lip 142 to a maximum diameter at the interface between lip 162 and wall 95. The net axial thrust urging assembly 92 toward plug 36 and loading lip 142 consequently is equal to the product of this difference in area and the upstream line fluid pressure.

If lip 142 becomes damaged such that it does not provide a bubbletight seal against plug 36, the fluid in groove 144 leaks into cavity 19 and is vented downstream. However, the seepage past lip 140 is relatively small and not enough to maintain upstream line pressure in groove 144 when there is any significant amount of leakage past lip 142. As a result, the fluid pressure in groove 144 reduces and approaches a balance with the pressure at the downstream side of the valve. When this condition occurs, it is apparent that the axial thrust opposing displacement of seat ring assembly 92 toward plug 36 is reduced to a value proportional to the combined annular areas of surfaces 116 and 117 or more particularly the seat ring area extending from a minimum diameter equal to that of surface 118 to a maximum diameter equal to that of lip 140.

The net axial force urging assembly 92 toward plug 36 is thus correspondingly increased as it will become equal to the upstream pressure acting over an annular area extending now from a diameter equal to that of lip 140 to the diameter of the interface between lip 162 and wall 95. This increased thrust correspondingly increases the compression of lip 140 against plug 36. The gasket or compressive stress in lip 140 is thereby increased with the result that it will seal bubbletight against plug 36.

From the foregoing, it is apparent that upon failure of lip 142 the primary seal is automatically transferred to lip 140 as a result of the increased axial seat ring thrust which compresses lip 140 sufficiently to provide a new fluidtight seal to upstream line fluid pressure. Under these conditions, lip 140 will seal both ways (that is, from passage 15 to cavity 19 as well as from cavity 19 to passage 15), whereas it sealed in only one direction when lip 142 was operative to provide the primary seal.

To provide the necessary unbalanced axial thrust for urging seat ring assembly 92 toward plug 36, it will be appreciated that the seat ring-to-valve body seal as provided by lip 162 must be so positioned as to maintain a seal with the valve body and to allow upstream fluid pressure to act over an area along the back face of assembly 92 which is appreciably greater than the area along which the upstream pressure acts on the front face of assembly 92. To provide the necessary area on the back face of assembly 92, lip 162 is of greater diameter than lip 142. In this connection, it will be appreciated that grooves 183 (FIG. 6), by providing fluid communication between groove 179 and passage 15, extends the effective area upon which the upstream pressure acts to cover the entire end face of assembly 92 facing shoulder 94.

As best shown in FIGS. 2 and 4, a lubricant cartridge 190 is formed with a hollow cylindrical housing 192 which defines a chamber at 194 for holding a supply of fluent plastic sealant and lubricant compound to be injected into groove 144. Housing 192 is welded or otherwise suitably fixed to the outside of body 11 around a bore 196 which is formed through member 12. Chamber 194 is closed at its outer end by a fitting head 198 which is threaded into housing 192.

At the inner end of the chamber 194 is a check valve unit 200 which mounted in housing 192. Head 198 may be an Alemite-type fitting or the like for introducing the material into chamber 194. Check valve unit 200 provides for the one-way flow of material from chamber 194 to a tube 202.

Tube 202 as best shown in FIG. 4, has an enlarged end 204 formed to have a rocking, sliding fit in a bore 206 formed by housing 192. A groove-seated O-ring type seal 208 is carried by end 204 in bore 206.

Tube 202 projects inwardly beyond bore 206, freely through bore 196, and terminates in an inner spherically rounded end 210. End 210 is slidably and universally rockably disposed in a conically tapered, radial opening 212 which is formed in seat ring 100. A radial flow restricting orifice 214 connects opening 212 to an enlarged blind bore 216. Bore 216 extends transversely of orifice 214 and is formed inwardly from the bottom wall 110 of groove 106. A bore 218 aligning with bore 216 is formed through insert 102 along an axis which is at a slight acute angle with the longitudinal seat ring axis. Bore 218 opens at its inner end into bore 216 and at its outer end into groove 144 as best shown in FIGS. 4 and 5. The diameters of bores 216 and 218 are equal.

From the foregoing, it is apparent that the plastic material in chamber 194 may be displaced under pressure through check valve unit 200, tube 202, orifice 214, bores 216 and 218 and into groove 144. Tube 202 provides a flexible conduit connection which allows unimpaired axial and radial displacement of seat ring assembly 92 and which enables the plastic material to flow from chamber 194 to groove 144 in all of the positions which assembly 92 may assume during valve operation.

Orifice 214 provides for a reduction in pressure of the plastic material flowing through bores 216 and 218. In addition, a comparatively large bore is provided at 216 and 218. This allows relatively high pressures to be built up in chamber 194 without exceeding the value at which the pressurized plastic material would force itself between ring 100 and section 111 at the interface between bores 216 and 218 to fracture or damage the bond between these parts.

Preferably, the aligned axis of opening 212 and orifice 214 intersect the center of gravity of assembly 92. As a result, twisting of seat ring 100, which will occur about the center of gravity due to dynamic and static forces, will not be imparted to tube 202 to cause interference with the desired displacement of assembly 92.

The pressure of plastic compound introduced into groove 144 is adjusted by turning fitting 198. When this pressure in groove 144 is increased to a value exceeding the pressure of line fluid in passage 15, lip 140 is deformed outwardly from groove 144 and effects a fluidtight seal in both directions. This occurs because lip 140 is forced into greater compression as it is moved by pressure of material in groove 144 into the curved periphery of plug 36 and effects a fluidtight seal which is tighter than that provided by lip 142.

The annular area of groove 144 in a plane normal to the valve pipeline axis is less than the annular area defined between the diameter of lip 140 and the interface between lip 162 and wall 95. Groove 144 also is so dimensioned as to have a cross-sectional flow area that lubricant and/or sealant of given viscosity will flow completely around and fill groove 144 before the product of the lubricant pressure times the groove annular area exceeds the axial thrust which is exerted on seat ring assembly 92 to urge it toward plug 36 at the maximum differential pressure rating of the valve. Therefore, groove 144 will fill with plastic material before it exerts enough force to force assembly 92 to back or jack off from plug 36.

In the previously described example for a valve having a maximum pressure differential rating of 1,500 p.s.i., a lubricant pressure of 3,000 p.s.i. is required to fill groove 144 and a sealant and/or lubricant pressure of 6,000 p.s.i. is required to exceed the seat thrust exerted by the 1,500 p.s.i. fluid pressure differential.

Upon reaching a lubricant pressure in groove 144 which is sufficient to cause seat ring assembly 92 to back away from plug 36 at a given fluid pressure differential across the seat ring assembly, the compression of lip 142 is reduced to correspondingly reduce its sealing efficiency. The reduction in sealing efficiency is sufficient to allow the pressurized plastic material injected into groove 144 to flow between plug 36 and lip 142 and thus separate lip 142 from the plug surface.

The increase in pressure of plastic material in groove 144 which causes seat ring assembly 92 to back away from plug 36 to thereby decrease the sealing efficiency of lip 142 has the effect of deforming lip 140 outwardly from groove 144 to provide a tight seal with plug 36 as previously described. Plastic material will thus seep past only lip 142 and into cavity 19 along the spherical plug surface.

In valves of the type thus far described, a predetermined torque is required to turn plug 36 to its opened position immediately after it is closed against a rapid buildup of line pressure to its maximum value. This torque is defined as the immediate operating torque.

If plug 36 is allowed to stand over a period of time in one position or the other and particularly in its closed position, a further torque will build up over the immediate operating torque. This further torque buildup is referred to as the time set torque and could raise the total torque to twice the amount of the immediate torque, making it very difficult to open or close the valve.

According to this invention, the time set torque is substantially eliminated by increasing the lubricant pressure in groove 144 just before plug 36 is opened to separate lip 142 from the plug seating surface in the manner just described. At the same time, however, leakage of upstream line fluid into cavity 19 will be prevented since increased lubricant pressure in groove 144 deforms lip 140 outwardly from the groove to compress it more tightly against the plug surface. As the lubricant and/or sealant flows between lip 142 and plug 36, it breaks any time set torque and also is effective to reduce the immediate operating torque by lubricating the valve plug surface. Thus, a combined action of breaking a time set torque and of lubricating the valve plug surface to reduce the immediate torque is achieved.

In the example of the 8-inch valve having a maximum differential operating pressure rating of 1,500 p.s.i., the immediate operating torque will be about 100 ft.-lbs. for a gearing ratio of 50:1 in the unshown valve operator. The time set torque developed when plug 36 remains closed for 4 days or longer will increase the total input or breakaway torque needed to open the valve to about 200 lb.-ft. as shown in FIG. 10. This total input torque is reduced to about 100 ft.-lbs. after pressurizing the lubricant in groove 144 to separate lip 142 from plug 36 just prior to opening the valve. The immediate torque is reduced further to about 70 ft.-lbs. after the lubricant from groove 144 is distributed by one full opening and closing cycle.

The annular seat ring end face areas over which line fluid pressure acts and the annular area over which the plastic material in groove 144 acts are so related that the pressure of the material needed in groove 144 to cause seat ring assembly 92 to back away from plug 36 at the maximum operating fluid pressure differential rating of the valve is appreciably less than that which would cause the bond between insert 102 and ring 100 to rupture in the vicinity where bores 216 and 218 meet. In the example of the 8-inch valve previously described the maximum pressure of plastic material required in groove 144 to cause seat ring assembly 92 to back away is about 6,000 p.s.i., whereas a pressure of 8,500 p.s.i. is required to rupture the bond between polyurethane and steel.

As assembly 92 is backed away from plug 36 the pressure of the plastic material in groove 144 is relieved by the seepage between lip 142 and the plug surface. As a result, the pressure of plastic material in groove 144 is limited to a value which is less than that required to rupture the bond between insert 102 and ring 100. The relationship between the annular groove area over which the plastic material acts and the seat ring end face areas over which the line fluid pressure acts thus provides a safety valve action by limiting the pressure of plastic material injected into groove 144.

By breaking the time set torque, the actual torque required for opening the valve will extend along the dashed curve section 230 (see FIG. 10) which merges with the torque curve section 232. The torque along curve sections 230 and 232 will remain essentially constant until plug 36 has rotated through an angle of about 8° from its fully closed position. At this point, further rotation of plug 36 requires a momentary, but significant increase in turning torque as indicated by the humped, torque curve section 234 in FIG. 10. This sharp increase is referred to as the peak cracking torque.

Peak cracking torque is thus defined as the normal sharp increase in turning torque just before the valve looses its final sealing during the opening cycle. It occurs for reasons not fully known in practically all ball-type plug valves and is particularly objectionably where it extends over a wide angle of valve plug turning movement.

According to another important aspect of this invention, the peak cracking torque is limited to only a very small angle of valve plug rotation. As a result, the inertia of the power valve operator (not shown) will readily carry plug 36 through the peak cracking torque. This is accomplished by the coaction between lips 140 and 142 as will now be described.

As plug 36 approaches its cracked-opened position, lip 142 will be compressed against plug 36 to maintain a fluidtight seal through the horizontal torque curve section 232. Lip 140 also will be compressed against the plug surface, but depending upon the lubricant pressure on groove 144, it may allow slight leakage of upstream line fluid into the lubricant groove. The foregoing condition of lips 140 and 142 is shown in FIG. 11 and will be maintained until plug 36 has been rotated through an angle of about 8° for this embodiment.

As plug 36 continues to rotate beyond an angle of 8°, it will, owing to its spherical curvature, begin to move away from lip 142 while maintaining compression of lip 140. As a result, the compressive stress in lip 142 will begin to reduce until at an angle of plug rotation of about 9° lip 142 will no longer effect a seal against plug 36. This condition is shown in FIG. 12.

At this stage, fluid pressure in groove 144 will be dissipated into cavity 19. Lip 140 will maintain a partial seal with plug 36 which sufficiently minimizes leakage into groove 144 as to prevent a material pressure buildup in the groove after the seal at lip 142 is lost.

As a consequence, the net annular seat ring assembly end face area over which the fluid pressure differential acts to thrust lip 140 against plug 36 is increased in the same manner as previously described when lip 142 failed to automatically effect the transfer of the primary seal to lip 140. Thus, the effective net annular area over which line fluid pressure acts along the back end of assembly 92 will extend from a minimum diameter equal to the lip 140 to a maximum diameter at the sealing interface between lip 162 and wall 95.

From the foregoing it is clear that as soon as lip 142 becomes ineffective and allows leakage as plug 36 is cracked to its FIG. 12 position, the axial seat ring thrust is increased to shift assembly 92 toward plug 36, thereby increasing the compression of lip 140 against plug 36. The resulting increased compressive stress in lip 140 causes it to seal against the upstream pressure differential across assembly 92.

As plug 36 approaches its cracked-open position, the sealing engagement of lip 142 against the plug surface limits compression of lip 140, thus confining the sealing contact area between lip 140 and the spherical plug surface to a narrow band width. However, as the corner of port 40 begins to cross lip 142, the latter will no longer seal, and seat ring assembly is moved with increased thrust toward plug 36 to increase the compression of lip 140 against the plug. At this stage, the pressure in groove 144 has dissipated with the result that the pressure differential bending lip 140 into groove 144 increases, thus tending to move lip 140 away from the plug surface. In this way, the compression of lip 140 is reduced so that only a slight additional rotation of plug 36 past the position where lip 142 no longer effects a seal causes lip 140 to loose its seal and crack open as shown in FIG. 13.

The increased compression of lip 140 against plug 36 as a result of rotating plug 36 to the position in FIG. 12 where lip 142 no longer effects a seal is accompanied by the rise in cracking torque indicated by curve section 234 in FIG. 10. Since the sealing area of lip 140 against the plug surface is very small and since, at this stage, the increased differential fluid pressure is bending lip 140 into groove 144 to move it away from the plug surface, the angle of plug rotation to crack lip 140 will be very small. As a result, the dwell in peak cracking torque will be very small and will diminish rapidly to a very low dynamic flowing torque as soon as lip 140 is cracked to allow line fluid in passage 15 to begin flowing into cavity 19 as shown in FIG. 13. Thus at 70° F., the peak cracking torque dwell period will only amount to about 2° of plug rotation and therefore can easily be overcome by the inertia of power mechanism for operating the valve.

The dwell period and magnitude of the peak cracking torque both decrease as the temperature decreases. This is due to the fact that polyurethane, from which insert 102 is made, contracts at a greater rate than the metallic parts of the valve. As a result of this difference in contraction, lips 140 and 142 pull partially away from plug 36 as the temperature decreases, and the lip compressive stresses are thereby reduced.

For example, the peak cracking torque at 70° F. is shown in FIG. 10 to be about 200 ft.-lbs. maximum. At −30° F., however, the peak cracking torque reduces to about 120 ft.-lbs. as indicated by the dashed curve section 236. The dwell of curve section 236 is also considerably reduced to about one-half degree of plug rotation.

The torque values shown in FIG. 10 are for an 8-inch valve in which an upstream fluid pressure differential of 1,500 p.s.i. has been applied across assembly 92.

Since the construction and arrangement of seat ring assembly 93 is the same as that just described for assembly 92, like reference numerals suffixed by the letter *a* have been applied to designate corresponding parts of assembly 93. Assembly 93 is also provided with a lubricant cartridge 240 which is the same as cartridge 190. Accordingly, like reference characters suffixed by the letter *a* have been applied to the parts of cartridge 240.

When conventional ball valves are used on gas lines, the line pressure drop across the downstream seat ring is commonly much greater than the line pressure drop across the upstream seat ring when the valve is cracked open. In other words, the difference between the valve plug cavity pressure and downstream pressure will be greater than the difference between the upstream line pressure and the valve plug cavity pressure. For example, the valve plug cavity pressure and downstream line pressure may very likely be 1,000 p.s.i. and 100 p.s.i. respectively when the upstream line pressure in a conventional ball valve is 1,500 p.s.i. This provides a pressure drop of 500 p.s.i. across the upstream seat and a considerably greater pressure drop of 900 p.s.i. across the downstream seat.

The unequal pressure drops mentioned above are due to the increased volume of flowing gas as it expands upon passing the upstream seat ring. This increase in volume is the result of the unavoidable pressure drop across the upstream seat ring when the valve is cracked open, and, owing to the increase in volume flowing past the downstream seat ring, the pressure drop across the downstream seat ring will be greater than the pressure drop across the upstream seat ring.

The greater pressure drop across the downstream seat ring is considered to be objectionable because the greater strain will be on the downstream seat ring in the cracked position of the valve. The force on the downstream seat ring, which results from the downstream pressure drop, tends to collapse the seat ring, whereas the force on the upstream seat ring is tensile and therefore has a less damaging effect on the seat ring structure. The seat ring construction of this invention decreases the downstream pressure drop by increasing the downstream flow area in the cracked position of the valve in a manner now to be described.

When plug 36 is cracked open, turning the corner of port 40 past lips 140 and 142 as shown in FIG. 14, upstream line gas begins to flow through port 40. Owing to the reduced flow area between plug 36 and seating assembly 92 at the cracked position of the valve, an upstream pressure drop will occur with the result that the fluid pressure in port 40 will be at some intermediate value between the upstream line pressure and the downstream line pressure beyond seat ring assembly 93. This pressure drop, of course, will be accompanied by a corresponding expansion in the volume of flowing gas.

At the same time, upstream pressure acting across the annular back face of assembly 92 holds the seat ring insert against the periphery of plug 36, thus confining the main stream of gas flowing into port 40 to a very small area. At the upstream side, it will be recalled that there is no fluid flowing through clearance 180 since upstream pressure compresses lip 162 against body surface 95 to provide a seat-to-valve body seal.

The reduced pressure of the increased volume of gas flowing through port 40 is applied to the front face of seat ring assembly 93 which comprises surfaces 188a, 116a, and 117a, lips 140a and 142a, and groove 144a. This pressure is sufficiently high to cause seat ring assembly 93 to back off from engagement with plug 36 against the bias exerted by spring 176a.

Line fluid will therefore flow around the downstream corner of port 40 and into passage 16. It also will flow into clearance 180a to exert a pressure which flexes or deforms lip 162a into groove 179a thus breaking the seat-to-valve body seal at the interface between lip 162a and wall 95a. In this way, line fluid will also flow through clearance 180a, past lip 162a, through slots 183a and into passage 16. The flow area for venting the gas from port 40 is thus increased by the flow passage area afforded by clearance 180a and slots 183a to increase the total flow rate past the downstream seat ring assembly. This increased area accommodates the increased volume of gas to thereby reduce the pressure drop across seat ring assembly 93. In effect, seat assembly 93 increases the downstream flow area by providing a separate passage through clearance 180a so that two streams of fluid flow from port 40, one through assembly 93 and the other around it.

Lip 162a is flexible enough to allow fluid to flow from cavity 19 or port 40 without excessive valve plug cavity pressure buildup. On the other hand, it is stiff enough to create a pressure drop so that the pressure of fluid entering groove 179a is considerably reduced. This creates an unbalance between the fluid pressure in cavity 19 and the opposing pressure of fluid in groove 179a and slots 183a. As a result, a pressure differential is developed across seat ring assembly 93, forcing it away from plug 36 and increasing the flow area for fluid passing into passage 16.

If, for example, the fluid pressure in cavity 19 is about 500 p.s.i., the pressure drop in fluid flowing through clearance 180a and past lip 162a will be about 300 p.s.i., thus leaving fluid in groove 179a only at a pressure of about 200 p.s.i. Lip 162a is flexed inwardly by a sufficient amount such that fluid will flow through clearance 180a faster than it can be replenished. As a result, pressure in cavity cannot build up to provide an objectionably pressure drop across assembly 93.

By effectively increasing the flow area past seat ring assembly 93 in the manner just described, the downstream pressure drop across assembly 93 is advantageously reduced considerably as compared with the downstream pressure drop experienced in conventional ball valves. Furthermore, the downstream pressure drop in the valve of this invention is so low that it is much less than half the total pressure differential between the upstream and downstream valve passages when plug 36 is cracked open as shown in FIG. 14. As a result, the remaining the larger part of the pressure drop will be across seat ring assembly 92 on the upstream side of plug 36.

As an example of the manner in which the seat ring structure of this invention alters the division of pressure drop between the upstream and downstream seats, the drop across assembly 93 will be more on the order of 500 p.s.i. and the drop across assembly 92 will be about 900 p.s.i. where the upstream line pressure in passage 15 is about 1,500 p.s.i. and the downstream line pressure in passage 16 is about 100 p.s.i. As compared with the previous example given for the pressure drops in a conventional ball valve, it is apparent that the seat ring structure of this invention effects a reversal of the magnitude of upstream and downstream seat ring pressure drops. The maximum strain which occurs in the downstream seat ring assembly of this invention as a result of cracking plug 36 is greatly reduced to thus minimize damage to the seat ring structure on the downstream side of the valve plug cavity. The greater pressure drop is now on the upstream seat ring assembly 92 where the resulting force is tensile and hence less damaging. As a consequence assemblies 92 and 93 can be provided with the same relative strength and the flow of fluid through the valve can be reversed without causing damage to the seat ring structures.

When plug 36 is in its closed position and pressure builds up in cavity 19 for some reason such as a temperature rise, the increased pressure acting along the front face of seat ring assembly 93 in the valve plug cavity backs assembly 93 off from plug 36 against the bias exerted by spring 176a. This breaks the lip seals to vent the cavity fluid pressure into the downstream passage 16. Relief of valve plug cavity pressure in this fashion is thus accomplished by what is referred to as the pop-off action of the seat ring assembly. A pressure differential of 50—100 p.s.i. across assembly 93 is sufficient to cause assembly 93 to back away or pop off from plug 36.

Increased pressure in cavity 19 is also applied through clearance 180a to flex lip 162a into groove 179a, thereby providing an additional vent passage for cavity fluid through clearance 180a and slots 183a in the same manner just described when plug 36 is cracked open.

When the excess pressure in cavity 19 is dissipated in the foregoing manner, spring 176a biases assembly 93 back to a position where lips 140a and 142a compress against the plug surface.

If the pressure in cavity 19 builds up at a faster rate than the rate at which the cavity fluid is vented by backing off seat ring assembly 93 and by flexing lip 162a inwardly, lip 162 on the upstream side of plug 36 will be deformed by the excess pressure into groove 179 when the cavity pressure exceeds the upstream line pressure in groove 179.

In the embodiment of FIGS. 1—14, seat ring assembly 93 on the downstream side of cavity 19 normally does not effect an operative seal with body 11 or with plug 36 especially since it will vent cavity pressure until a condition of pressure equilibrium develops in cavity 19 and passage 16.

From the foregoing, it is clear that slots 183 and 183a normally function differently at the upstream and downstream sides of the valve. On the upstream seat, slots 183 feed upstream pressure to pressure energize lip 162, and the flow capacity of slots 183 is made sufficiently large so as to exceed any leakage that may possibly occur past lip 162. On the downstream side, slots 183a relieve the pressure behind seat ring assembly 93 to allow assembly 93 to pop off or move away from plug 36.

When the valve is cracked in the manner just described, extension 130, by providing a support for lip 142, precludes the tendency of upstream line fluid pressure entering cavity 19 to push lip 142 into engagement with the plug surface and to thus prevent it from being cracked at the proper angle of valve plug rotation from closed position. As a result, the desired upstream pressure drop is maintained and damage to section 112 is avoided.

It will be appreciated that if the fluid flow through the valve is reversed, the operation and functions of assemblies 92 and 93 are simply reversed.

The foregoing seat ring construction and operation provide an extremely tight sealing valve at both low and high line fluid pressures, as well as a valve which may readily be lubricated to greatly reduce the immediate operating and time set torque. As a result, manual operation is made easier, and smaller and thus more economical gear reduction units and automatic valve operators may be used.

FIG. 15 illustrates a modified form of seat ring 100 and section 112 wherein extension 130 is replaced by an inwardly hooking annular lip section 250 which is integral with ring 100.

Lip section 250 curves radially inwardly and axially rearwardly into groove 106 and is seated in an axially outwardly opening, annular groove 252 formed in section 112 radially outwardly from lip 142. Lip section 250 overhangs the forward outer peripheral edge of section 112 facing cavity 19 and defines with surface 109 an annular groove 254 which opens axially toward the bottom of groove 106. Groove 254 is completely filled by the forward outer peripheral end portion of section 112. Lip section 250 and insert section 112 interfit and are bonded completely throughout the interface therebetween.

The inner end section 256 of ring 100 defining groove surface 108 may also be turned at its outer end into groove 106 as shown in FIG. 15 to provide an outwardly hooking annular end lip 258. Lip 258 is interfittingly seated in an annular radially inwardly opening groove 260 in section 112 and is bonded to section 112. Lip section 250 and lip 258 thus cooperate to provide a secure mechanical retention for insert section 112 to prevent it from being torn out of groove 106.

These lip sections may be machined as shown, and the elastomer cast in place, or the elastomer may be cast into a seat ring as shown in other embodiments, then lip sections 250 and 256 rolled over ("coined") to the configuration shown in FIG. 15.

FIG. 16 illustrates another modified form of seat ring 100 wherein the inner part of groove 106 is enlarged by forming the outer groove periphery with an annular surface 270 which slopes inwardly from bottom wall 110 at a negative retention angle with respect to the longitudinal seat ring axis. Surface 270 may extend from wall 110 to a region somewhat beyond the interface between sections 111 and 112. The remaining part of the outer groove periphery may be of essentially uniform diameter as indicated at 272. In cross section groove 106 therefore converges to a mouth which is more narrow than the radial dimension at its inner end. This seat ring construction thus provides an alternate means for structurally retaining insert 102 in groove 106. The surface of groove 106 may also be roughened to provide a bond of increased strength.

FIG. 17 illustrates a modified seat ring construction for retaining member 104. As shown ring 100 is formed with an annular groove 280 having a dovetail contour and opening radially outwardly and axially rearwardly toward the outer, back corner of the seat ring assembly. Groove 280 is formed with an annular bottom wall 282 and symmetrical converging sidewalls 284 and 286 sloping inwardly to define a groove mouth which is more narrow than the width of the groove at wall 282.

Still referring to FIG. 17, groove 280 is formed with an outer circumferential surface 288 and a recessed, radially extending annular face 290. Surface 288 and face 290 define recess 150 which receives member 104, and groove 280 is formed at the corner between surface 288 and face 290. In cross section wall 282 extends at an acute angle with respect to the longitudinal seat ring axis.

In the embodiment of FIG. 17, member 104 is formed with a flaring, dovetail-shaped tongue 292 having an annular configuration and snugly interfitting in groove 280. Member 104 interfits with surface 288 and end face 290 and is integrally formed with tongue 292 which is forcibly sprung with an interference fit into groove 280 in the assembly of the seat ring parts. This dovetail and groove construction securely retains members 104 on seat ring 100 without bonding.

It will be appreciated that the various modifications illustrated in FIGS. 15—17 may be incorporated in any selected combination into the first seat ring embodiment of FIGS. 1—14. For example, all or only selected ones of the modifications shown in FIGS. 15—17 may be incorporated into the seat ring structure. It further will be appreciated that various features of this invention may be incorporated into other types of valves such as gate valves, globe valves, and in-line valves.

What we claim and desire to be secured by Letters Patent is:

1. A valve assembly comprising a body formed with upstream and downstream fluid flow passages opening at their inner ends into an internal valve closure member space, a valve closure member displaceable in said space between positions where it respectively blocks and provides fluid communication between said passages, a relatively rigid seat ring mounted at the inner end of at least said upstream passage and having an annular recess opening toward said closure member in said space, and an annular seat of elastically deformable material anchored in said recess and projecting through the open end of said recess, said seating being characterized in that it is formed with a pair of spaced-apart annular, differently diametered sealing lips disposed beyond said recess and compressed against said closure member, one of said lips normally being sufficiently compressed against said closure member to seal against flow of fluid in both directions between said upstream passage and said space regardless of fluid pressure variations in said upstream passage and said space, and the other of said lips normally being compressed against said closure member to a lesser degree than said one lip to be less effective than said one of said lips to seal against upstream fluid flow toward said space when said one lip is effective to provide a fluidtight seal against said closure member, and means for increasing the compression of said other lip against said closure member to seal against fluid flow in both directions between said upstream passage and said space when said one lip fails to seal against fluid flow from said upstream passage to said space.

2. The valve assembly defined in claim 1 wherein said valve closure member is a trunnioned, ported, ball-type valve plug rotatable between said positions within said space and having a spherically contoured surface engaged by said lips.

3. The valve assembly defined in claim 2 wherein both of said lips are coaxial with the longitudinal axis of said rigid seat ring, and wherein said one lip is of larger diameter than said other lip and projects from an annular face of said seat axially beyond said other lip.

4. The valve assembly defined in claim 3 wherein said other lip is sufficiently thin in cross section that it is deformable outwardly and away from said surface of said valve plug by fluid pressure in said upstream passage when the upstream pressure acting on one side of said other lip exceeds the pressure acting on the opposite side of said other lip by a predetermined magnitude.

5. The valve assembly defined in claim 4 wherein said annular seat is formed with an annular groove between said lips, and wherein said valve assembly further comprises means for introducing pressurized plastic material into said groove for distribution between said one lip and said surface of said plug, said pressurized material in said groove being effective to deform said other lip against said plug sufficiently to seal against fluid flow in both directions between said upstream passage and said groove.

6. The valve assembly defined in claim 3 comprising means in said body for supporting said ring for limited axial displacement toward and away from said plug, and an annulus of elastically deformable material anchored on said rigid seat ring and reacting against an internal surface in said body for biasing said rigid seat ring together with said annular seat toward said plug and to a position where said lips are deformed against said plug, the fluid pressure in said upstream passage acting upon said annulus and said seat ring to apply predetermined force for urging the assembly of said annulus, said rigid seat ring, and said annular seat toward said plug, and said other lip being exposed to fluid pressure in said upstream passage and being sufficiently thin in cross section that it is deformable outwardly into the region between said lips and away from said plug to admit upstream fluid into said region when the pressure of fluid in said upstream passages exceeds fluid pressure in said region by a predetermined amount, the pressure of fluid in said region being effective to oppose said force.

7. The valve assembly defined in claim 6 wherein said annular seat is stiffer than said annulus.

8. The valve assembly defined in claim 6 wherein said annulus is formed with a circumferentially extending lip deformed against the interior of said body to provide an annular seal between said seat ring and said body, with an annular axially extending land engaging said internal surface of said body to bias said assembly toward said plug, and with grooves in said annular land for introducing upstream fluid to a space between said land and said circumferential lip where it compresses the circumferential lip of said annulus against the interior of said body.

9. The valve assembly defined in claim 1 wherein said seat is formed from polyurethane.

10. The valve assembly defined in claim 7 wherein both said seat and said annulus are formed from polyurethane.

11. A valve assembly comprising a body formed with upstream and downstream fluid flow passages opening at their inner ends into an interval valve closure member space, a valve closure member displaceable in said space between positions where it respectively blocks and provides fluid communication between said passages, and a seat ring assembly comprising a rigid seat ring mounted within said body at the inner end of at least one of said passages and having an annular recess opening toward said valve closure member, and an annular seat of elastically deformable material anchored in said recess and projecting beyond said recess, said seat having an annular surface facing said closure member and being characterized in that it is formed with a pair of spaced apart, annular, differently diametered sealing lips projecting from said surface and being compressed against said closure member and being sufficiently stiff to maintain said ring and the remaining surface of said seat spaced from said closure member at least up to the maximum pressure differential for which said assembly is rated.

12. The valve assembly defined in claim 11, wherein said closure member is a ported, ball-type plug, and wherein said valve assembly further comprises trunnion means journaling said plug for rotation between said positions and confining said plug against displacement toward and away from the inner end of each of said passages, and means axially biasing said assembly toward said plug and to a position where said lips are deformed against a spherical surface on said plug.

13. In a valve assembly having a body formed with upstream and downstream fluid flow passages opening at their inner ends into an internal valve closure member space and a valve closure member displaceable in said space between positions where it respectively blocks and provides fluid communication between said passages, seat ring means mounted within said body at the inner end of at least one of said passages and comprising a rigid ring formed with an annular recess opening toward said member and an annular seat of elastically deformable material anchored in said recess and projecting beyond said recess for engagement with said closure member, said seat being formed at its surface facing said closure member with spaced-apart differently diametered annular sealing lips compressed against said member, with one of said lips normally being compressed against said member more tightly and over a greater sealing contact area than the other of said lips.

14. A valve assembly comprising a body formed with upstream and downstream fluid flow passages opening at their inner ends into an internal valve closure member cavity, a trunnioned valve closure member rotatable in said cavity between positions where it respectively blocks and provides fluid communication between said passages, seat ring means mounted within said body for limited axial displacement at the inner end of at least said upstream passage and being formed with an annular recess opening toward said closure member, an annular seat of elastically deformable material anchored in said recess, said seat projecting from said recess and being formed with a pair of spaced apart, annular, differentially diametered, sealing lips engaging said closure member, means applying a force for axially urging the assembly of said seat ring means and said seat towards said closure member to compress said lips against said closure member, with one of said lips normally being compressed with greater tightness against said member than the other of said lips to provide a bidirectional fluidtight seat-to-closure member seal around the inner end of said upstream passage at least up to the maximum pressure differential for which the valve assembly is rated, and means effective upon failure of said one lip to prevent fluid leakage in a predetermined direction for increasing said force to deform at least said other lip with greater tightness against said closure member.

15. The valve assembly defined in claim 13, wherein said one lip is of larger diameter than said other lip.

16. In a valve assembly having a body formed with upstream and downstream fluid flow passages opening at their inner ends in a valve closure member space, a valve closure member displaceable in said space between positions where it respectively blocks and provides fluid communication between said passages and seat ring means for said closure member and comprising rigid, metallic holder means mounted in said body and formed with an annular recess opening toward said valve closure member, the improvement comprising an annular seat defined by a plurality of separately formed elastically deformable annular sections, one of said sections being received in only the inner part of said recess and anchored to said holder means, the other of said sections being bonded at least to said one section and projecting through the outer part of said recess for seating engagement with said valve closure member, said other section having a thermal coefficient of expansion which is greater than that of said metallic holder means, and said one section having a thermal coefficient of expansion which is also greater than that of said holder means but which is less than that of said other section.

17. The valve assembly defined in claim 16, wherein said closure member is a ported, ball-type valve plug, and wherein said valve assembly further comprises trunnion means journaling said plug for rotation between said positions and confining said plug against displacement toward and away from the inner end of each of said passages, and mans axially biasing the assembly of said holder means and said seta toward said plug and to a position where the other of said sections is deformed against a spherical surface on said plug, said one of said sections filling the inner part of said recess and said other of said sections filling the remainder of said recess.

18. The valve assembly defined in claim 16, wherein said one of said sections has embedded therein relatively hard material for reducing its thermal coefficient of expansion to a value that is less than that of the other of said sections.

19. The valve assembly defined in claim 16, wherein said one of said sections has embedded therein glass fibers for reducing its thermal coefficient of expansion to a value that is less than that of the other of said sections.

20. The valve assembly defined in claim 16, wherein both sections are formed for polyurethane and wherein said one of said sections has a material embedded therein for reducing its thermal coefficient of expansion to a value that is less than that of the other of said sections.

21. In a valve assembly, a body formed with upstream and downstream fluid flow of passages opening at their inner ends into an internal valve closure member space, a valve closure member displaceable within said space between position where it respectively blocks and provides fluid communication between said passages, rigid seat ring mounted within said body at the inner end of at least one of said passages and being formed at its inner surface facing said member with an annular recess opening toward said member, and an annular seat of elastically deformable material anchored in and projecting beyond said recess for engagement with said member, the portion of said inner surface disposed radially outwardly from said recess defining an annular axially extending lip, and said seat having an annular extension hooked over the end face and outer peripheral surface of said lip and bonded to said lip to secure said seat against dislodgement from said recess.

22. A valve assembly comprising a body formed with upstream and downstream fluid flow passages opening at their inner ends into an internal valve closure member cavity, a trunnioned valve closure member rotatable in said cavity between positions where it respectively blocks and provides fluid communication between said passages, a relatively rigid seat ring mounted for limited axial displacement between said closure member and an opposing internal surface of said body at least at the inner end of said upstream passage, said seat ring being formed with an annular recess opening toward said closure member, an annular valve closure member of elastically deformable material seat anchored in said recess and extending beyond said recess toward said closure member, said annular seat having an annular surface disposed beyond said recess and facing said closure member, and said annular seat having an annular groove defined by a pair of spaced apart, differently diametered annular lips which are integral with said seat and which extend from said annular surface, means for axially biasing said seat ring toward said closure member to initially compress and thereby preload said lips against said closure member in absence of a fluid pressure differential across the assembly of said set ring and said annular seat, with one of said lips being sufficiently deformed against said closure member to provide a seat-to-closure member seal, means for introducing pressurized plastic material into said groove, the other of said lips being deformed against said closure member by the pressure of plastic material in said annular groove to seal against flow of said platic material between said other lip and said closure member and to thereby enable the pressure of the plastic material in said annular groove to build up sufficiently for effecting the distribution of said plastic material between said one lip and said closure member, said lips being sufficiently stiff to normally maintain said closure member spaced from said seat ring and the remaining surface of said annular seat.

23. A valve assembly comprising a body formed with upstream and downstream fluid flow passages opening at their inner ends into a valve plug cavity, a trunnioned, ported, ball-type valve plug rotatable in said cavity between positions where it respectively blocks and provides fluid communication between said passages, a relatively rigid seat ring mounted for limited axial sliding movement between said plug and an opposing internal surface of said body at the inner end of at least said upstream passage, said seat ring being formed with an annular recess opening toward said plug in said cavity, an annular seat of elastically deformable material anchored in said recess and extending beyond said recess, said annular seat having an annular surface at its end disposed beyond said recess and facing said plug, a pair of spaced apart, differently diametered annular lips formed integral with said annular seat and extending from said annular surface for engagement with said plug, means for axially biasing said seat ring toward said plug to deform said lips against said plug, the grater diametered one of said lips normally being sufficiently deformed against said plug to provide a primary bidirectional seat ring-to-plug seal for preventing flow of fluid in either direction between said upstream passage and said cavity, the smaller diametered one of said lips being configured and normally deformed against said plug to a lesser degree than said larger diametered seal to provide a secondary seat ring-to-plug seal which is less effective than said primary seal for preventing fluid flow from said upstream passage toward said cavity as long as said larger diametered lip is effective to establish said primary seal, and means including surface means forming a part of the assembly of said biasing means, said seat ring and said annular seat and coacting with fluid pressure in said body for sufficiently increasing the deformation of said smaller diametered lip against said plug to establish a bidirectional seat ring-to-plug seal preventing fluid flow in either direction between said upstream passage and said cavity whenever said larger diametered lip becomes ineffective to provide its fluid-tight seal for preventing flow of fluid from said upstream passage to said cavity whereby the action of said primary seal is transferred to said smaller diametered lip whenever said larger diametered lip fails to seal against flow of fluid at least from said upstream passage to said cavity.

24. A valve assembly comprising a body formed with upstream and downstream fluid flow passages opening at their inner ends into an internal valve plug cavity, a trunnioned valve plug rotatable in said cavity between positions where it respectively blocks and provides fluid communication between said passages, means comprising a first annular lip of elastically deformable material compressed against said plug at the inner end of said upstream passage for establishing a first bidirectional seal against fluid flow in either direction between said upstream passage and said cavity when said plug is in its fluid-blocking position and means comprising a second annular lip of elastically deformable material compressed against valve plug for establishing a second bidirectional seal against fluid flow in either direction between said upstream passage and seal cavity in response to a failure of said first lip to seal against flow of fluid from said upstream passage to said cavity.

25. The valve assembly defined in claim 24, wherein said means comprising said second annular lip further includes means for continuously venting fluid in said cavity to said downstream passage whenever the pressure of fluid in said cavity exceeds the pressure of fluid in said downstream passage by a predetermined magnitude.

26. A valve assembly comprising a body formed with upstream and downstream fluid flow passages opening at their inner ends into a valve closure member space, a trunnioned, ported, ball-type valve plug rotatable in said space between positions where it respectively blocks and provides fluid communication between said passages, a relatively rigid seat ring mounted at the inner end of at least one of said passages for limited axial sliding movement between said plug and an opposing internal surface of said body, an elastically deformable seat carried by said ring for engagement with said plug and an annulus of elastically deformable material anchored on the end of said ring remote from said closure member and being characterized in that it seals against said body to keep fluid in said one passage from flowing around the outer periphery of said ring and into said space, but provides for fluid in said space to flow around the outer periphery of said ring and into said one passage whenever the fluid pressure in said space exceeds the fluid pressure in said one passage by a predetermined magnitude, said annulus being formed with an annular land, a circumferential sealing lip and an annular groove between said land and said lip, said land projecting beyond the end face of said seat ring remote from said plug and having a radial surface deformed against said opposing internal surface of said body for axially biasing said seat ring toward said plug to deform said seat against said plug, said circumferential lip being seated against the interior of said body to establish a seal between said body and said ring for sealing against flow of fluid from said one passage to said space when the fluid pressure in said space does not exceed the pressure in said one passage by said predetermined magnitude, said land having groove means to establish fluid communication between said one passage and said annular groove, and said lip being deformable into said annular groove by fluid pressure in said space when it exceeds the fluid pressure in said one passage by said predetermined magnitude to provide fluid communication between said space and said annular groove.

27. In a valve assembly having a body formed with upstream and downstream fluid flow passages opening at their inner ends into a valve plug cavity, and a ported, ball-type valve plug rotatable in said cavity between positions where it respectively blocks and provides fluid communication between said passages, a seat ring assembly mounted in said body at least at the inner end of said upstream passage and comprising a rigid seat ring having an annular recess opening toward said plug, an annular seat of elastically deformable material anchored in said recess and projecting therefrom, said annular seat having an annular surface facing said plug, means forming an annular groove in said surface and opening toward said plug, and means including passage means for introducing plastic material under pressure into said groove for distribution as a band around the surface of said plug, said annular groove forming means comprising a deflectable annular lip projecting from said surface and engaging said plug, said lip having inner and outer peripheral surfaces, with said outer peripheral surface defining the inner peripheral side of said groove, said outer peripheral surface having a slope in cross section which is appreciably greater than that of said inner peripheral surface to provide a greater amount of elastically deformable material supporting said lip against outward deflection and into said groove as compared with the amount of elastically deformable material supporting said lip against inward deflection into the inner end of said upstream passage, said seat ring being formed with an inner, annular end face extending radially between said recess and the inner periphery of said ring, and said annular seat extending at its inner periphery appreciably axially beyond said end face, to provide freedom for said lip to flex inwardly.

28. The valve assembly defined in claim 27, wherein pressure of plastic material introduced into said groove is effective to deform said lip against the periphery of said plug to provide under predetermined conditions a fluidtight seal against fluid flow into said cavity.